(12) United States Patent
Tateyama et al.

(10) Patent No.: US 6,874,082 B2
(45) Date of Patent: Mar. 29, 2005

(54) DATA COMMUNICATION ON A SERIAL BUS USING A SELECTED PROTOCOL BASED ON AN OBTAINED DEVICE IDENTIFIER

(75) Inventors: Jiro Tateyama, Kanagawa-ken (JP); Naohisa Suzuki, Kanagawa-ken (JP); Koji Fukunaga, Tokyo (JP); Kiyoshi Katano, Chiba-ken (JP); Atsushi Nakamura, Kanagawa-ken (JP); Makoto Kobayashi, Kanagawa-ken (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/041,647

(22) Filed: Jan. 10, 2002

(65) Prior Publication Data

US 2002/0062407 A1 May 23, 2002

Related U.S. Application Data

(62) Division of application No. 09/025,128, filed on Feb. 17, 1998, now Pat. No. 6,425,019.

(30) Foreign Application Priority Data

| Feb. 14, 1997 | (JP) | 9-030982 |
| Apr. 8, 1997 | (JP) | 9-089825 |
| Apr. 8, 1997 | (JP) | 9-089826 |
| Apr. 30, 1997 | (JP) | 9-112809 |

(51) Int. Cl.[7] ............... G06F 15/177; G06F 3/00

(52) U.S. Cl. ............... 713/1; 710/11; 710/38

(58) Field of Search ............... 710/11, 38, 105, 710/129; 709/228; 713/1

(56) References Cited

U.S. PATENT DOCUMENTS 4,648,061 A    3/1987  Foster
5,012,470 A    4/1991  Shobu et al.
5,136,716 A  * 8/1992  Harvey et al. ............... 709/228
5,142,528 A    8/1992  Kobayashi et al.
5,303,336 A    4/1994  Kageyama et al. ......... 395/114
5,349,649 A  * 9/1994  Iijima ........................ 709/228
5,432,775 A    7/1995  Crayford ..................... 370/10

(Continued)

FOREIGN PATENT DOCUMENTS

| EP | 0061585 | 10/1982 |
| EP | 0191177 | 8/1986 |
| EP | 0260086 | 3/1988 |
| EP | 0364866 | 4/1990 |
| EP | 0588744 | 3/1994 |
| EP | 0596648 | 5/1994 |
| EP | 0613274 | 8/1994 |

(Continued)

OTHER PUBLICATIONS

"A Byte abut Bi–Directional Parallel Protocol", A Review of the IEEE–1284 Standard, Dec. 9, 1994, pp 1–2.*
R. Nass, "Firewire Interface Connects PCS to Consumer Electronics Devices," Electronic Design, vol. 44, No. 16, Aug. 5, 1996, pp. 57–59.

Primary Examiner—Chun Cao
(74) Attorney, Agent, or Firm—Fitzpatrick, Cella, Harper & Scinto

(57) ABSTRACT

In response to a request from a host device using an initial protocol, capability information including information indicative of a plurality of communication protocols is returned to the host device, and a communication protocol, designated by the host device based on the capability information, is set, and print data is received from the host device by the set communication protocol. In a system using an interface connected to various types of devices, e.g., an IEEE 1394 serial bus, a communication protocol, which is used when a host device transfers print data to a printer, is not limited to that unique to the manufacturer of the device.

13 Claims, 33 Drawing Sheets

U.S. PATENT DOCUMENTS

| | | | |
|---|---|---|---|
| 5,452,420 A | 9/1995 | Engdahl et al. | |
| 5,483,656 A | 1/1996 | Oprescu et al. | 395/750 |
| 5,535,334 A | 7/1996 | Merkley et al. | |
| 5,550,957 A | 8/1996 | Davidson, Jr. et al. | |
| 5,559,967 A | 9/1996 | Oprescu et al. | |
| 5,581,708 A | 12/1996 | Iijima | |
| 5,586,117 A | 12/1996 | Edem et al. | |
| 5,634,074 A | 5/1997 | Devon et al. | |
| 5,636,333 A | 6/1997 | Davidson, Jr. et al. | |
| 5,696,606 A * | 12/1997 | Sakayama et al. | 358/468 |
| 5,748,915 A * | 5/1998 | Iijima | 710/105 |
| 5,751,975 A * | 5/1998 | Gillespie et al. | 710/126 |
| 5,790,648 A * | 8/1998 | Bailis et al. | 379/201.04 |
| 5,799,171 A * | 8/1998 | Kondou | 395/500.48 |
| 5,828,855 A * | 10/1998 | Walker | 710/129 |
| 5,905,906 A | 5/1999 | Goffinet et al. | |
| 5,930,264 A * | 7/1999 | Nguyen | 370/466 |
| 6,018,816 A | 1/2000 | Tateyama | |
| 6,061,149 A * | 5/2000 | Hosokawa et al. | 358/442 |
| 6,125,122 A * | 9/2000 | Favichia et al. | 370/466 |
| 6,334,161 B1 | 12/2001 | Suzuki et al. | |
| 6,425,019 B1 * | 7/2002 | Tateyama et al. | 710/11 |
| 6,445,716 B1 * | 9/2002 | Favichia et al. | 370/466 |

FOREIGN PATENT DOCUMENTS

| | | |
|---|---|---|
| EP | 0652668 | 5/1995 |
| EP | 0679014 | 10/1995 |
| EP | 0681387 | 11/1995 |
| EP | 0689296 | 12/1995 |
| EP | 0800299 | 10/1997 |
| GB | 2288954 | 11/1995 |
| JP | 363023444 A * | 1/1988 |
| JP | 404052844 A * | 2/1992 |
| JP | 4-227524 A | 8/1992 |
| JP | 4-273320 A | 9/1992 |
| JP | 9-026860 A | 1/1997 |
| WO | WO 87/01484 | 3/1987 |
| WO | WO94/16389 A1 | 7/1994 |
| WO | WO 95/10912 | 4/1995 |
| WO | WO 95/30960 | 11/1995 |
| WO | WO 96/13776 | 5/1996 |

* cited by examiner

FIG. 3B

MINIMUM FORMAT CONFIGURATION ROM

| 01 | VENDOR ID |
|----|-----------|

FIG. 3C

GENERAL FORMAT CONFIGURATION ROM

| LENGTH OF bus_info_block | LENGTH OF ROM | CRC |
|---|---|---|
| bus_info_block (ASCII CODE OF 1394 BUS AND INFORMATION ON WHETHER OR NOT NODE HAS CAPABILITY OF ISOCHRONOUS RESOURCE MANAGEMENT, AND CAPABILITIES AS CYCLE MASTER AND BUS MANAGER) | | |
| root_directory (INDICATE VENDOR ID AND NODE FUNCTION) | | |
| unit_directories (INDICATE UNIT TYPE AND DRIVER SOFT VERSION) | | |
| root & unit_leaves | | |
| vendor_dependent_information | | |

DIGITAL CAMERA CONFIGURATION ROM

CLOCK : EXCLUSIVE-OR SIGNAL BETWEEN DATA AND STROBE

BRANCH : NODE WITH TWO OR MORE NODE CONNECTIONS

LEAF : NODE WITH SINGLE PORT CONNECTION

□ : PORT
c : PORT CORRESPONDING TO CHILD NODE
p : PORT CORRESPONDING TO PARENT NODE

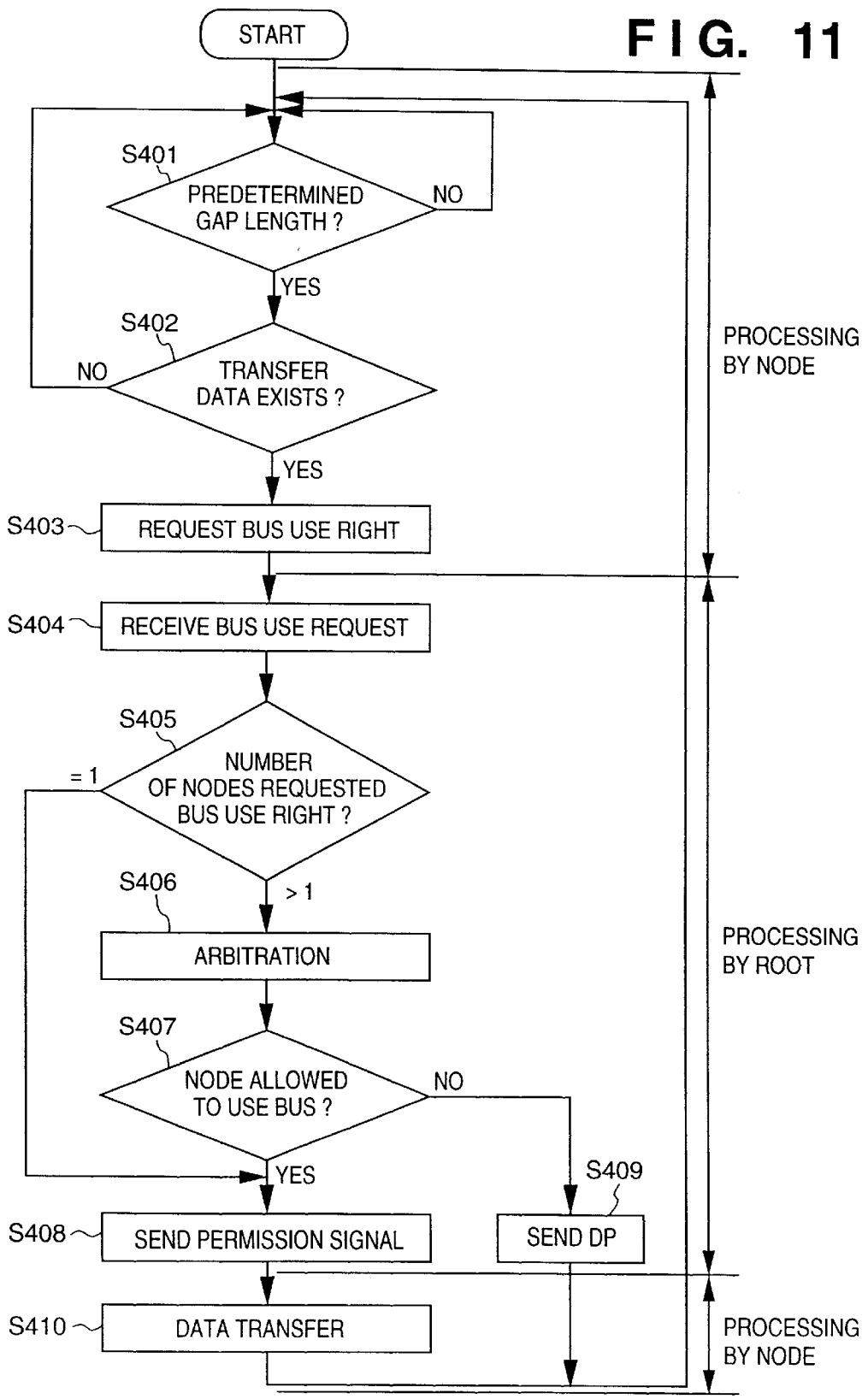

FIG. 31
| UNIQUE ID | NODE ID | STATUS | CAPABILITY |
|---|---|---|---|
|  |  |  |  |
|  |  |  |  |
| ≈ | ≈ | ≈ | ≈ | ≈ |
|  |  |  |  |
FIG. 32
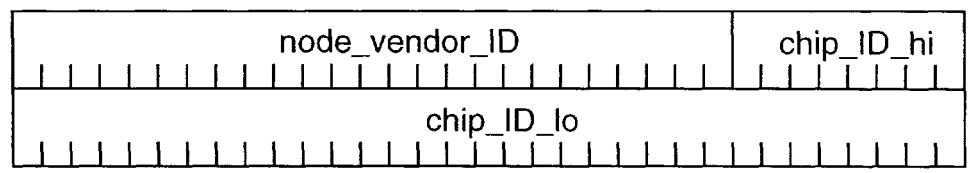
FIG. 33

DATA COMMUNICATION ON A SERIAL BUS USING A SELECTED PROTOCOL BASED ON AN OBTAINED DEVICE IDENTIFIER

This application is a division of application Ser. No. 09/025,128 U.S. Pat. No. 6,425,019, filed on Feb. 17, 1998.

BACKGROUND OF THE INVENTION

1. Field of the Invention

The present invention relates to data communication apparatus and method and, more particularly to data communication apparatus and method which performs data communication such that the communication protocol for data communication between a host device and a target device is not limited on the target device.

Further, the present invention relates to a data communication apparatus and method in a network where devices having a plurality of protocols are connected via a serial bus.

2. Description of Related Art

Various types of systems which transfer data to a printer via a bus are known. For example, a known technique is to output data from a computer to the printer by using a defacto standard interface such as a SCSI (Small Computer System Interface) or Centronics interface.

However, printer manufacturers respectively provide a printer protocol unique to their printer for transferring data to the printer via these interfaces, thus lacking versatility.

Particularly, upon outputting print data by using a serial interface connecting various types of devices, such as an IEEE 1394 interface, it is desirable to solve the above problem of the lack of versatility.

SUMMARY OF THE INVENTION

The present invention has its object to provide data communication apparatus and method which enable data communication such that the communication protocol between a host device and a target device is not limited on the target device.

Further, another object of the present invention is to provide data communication apparatus and method appropriate to data communication using a serial interface based on, e.g., the IEEE 1394 standards.

Further, another object of the present invention is to provide data communication apparatus and method appropriate to directly transfer image data from a host device to a target device without a host computer.

According to the present invention, the forging objection are attained by providing a communication system comprising a first device, a second device, and a serial bus which defines a predetermined address space for each of the first and second devices, wherein the first device includes first protocol capability storage means, which is in the address space defined by the serial bus, for storing information on usability of respective data transport protocols, the second device includes: first identifying means for reading contents of the first protocol capability storage means by designating an address defined by the serial bus and identifying the read contents; and first determination means for determining a data transport protocol on the basis of the contents of the first protocol capability storage means, wherein the first identifying means identifies a plurality of usable data transport protocols in advance of determination by the first determination means.

Further, the foregoing objects are attained by providing a data communication method for performing data communication on a serial bus, characterized by comprising the steps of: obtaining capability information of a target device by communication using an initial protocol; having the target device set a communication protocol which can be used in data communication, based on the obtained capability information; and performing the data communication with the target device based on the set communication protocol.

Further, the foregoing objects are attained by providing a data communication method for performing data communication on a serial bus, characterized by comprising the steps of: returning capability information to a host device in response to a request using an initial protocol from the host device; setting a communication protocol to be used in data communication, in accordance with an instruction from the host device based on the capability information; and performing data communication with the host device based on the set communication protocol.

Further, the foregoing objects are attained by providing a data communication apparatus for performing data communication on a serial bus, characterized by comprising: communication means corresponding to an initial protocol and a plurality of communication protocols for data communication; storage means in which capability information including information indicative of the plurality of communication protocols is stored; and setting means for setting a communication protocol of the communication means, wherein the communication means sends the capability information stored in the storage means based on a request by using the initial protocol from a host device, and the setting means sets the communication protocol of the communication means in accordance with an instruction by using the initial protocol from the host device.

Further, the foregoing objects are attained by providing a data communication method for performing data communication on a serial bus, characterized by comprising the steps of: receiving a connection request from a host device; setting the communication protocol to be used in data communication if it is recognized that the host device does not correspond to a predetermined protocol; trying communication with the host device by the set communication protocol; and performing the data communication with the host device by using the set communication protocol, if the communication with the host device is established.

Further, the foregoing objects are attained by providing a data communication apparatus for performing data communication on a serial bus, characterized by comprising: communication means corresponding to an initial protocol and a plurality of communication protocols for data communication; and control means for controlling the data communication with a host device, wherein if the control means recognizes, from a connection request received by the communication means from the host device, that the host device does not correspond to the initial protocol, the control means sets a predetermined communication protocol at the communication means, tries communication with the host device by the set communication protocol, and if the communication with the host device is established, performs data communication with the host device by using the set communication protocol.

Further, another object of the present invention is to provide a data communication apparatus and method which adjust the protocol for a host device which does not correspond to an initial protocol.

According to the present invention, the foregoing object is attained by providing a data communication method for performing data communication on a serial bus, comprising the steps of: obtaining an identifier of a host device which does not correspond to an initial protocol; recognizing a protocol of the host device based on the obtained identifier; and setting the protocol as a communication protocol for communication with the host device, if the recognized protocol is available.

Further, another object of the present invention is to provide a data communication apparatus and method which reduce the frequency of protocol change in a multi-protocol environment, to prevent degradation of efficiency due to protocol re-setting.

According to the present invention, the foregoing object is attained by providing a data communication method for performing data communication on a serial bus, comprising the steps of: obtaining capabilities of devices connected to the serial bus; counting protocols of the devices, by each type, based on the obtained capabilities; determining one of the protocols to be used with priority, based on the result of counting; and notifying the determined protocol to the devices.

Further, the foregoing object is attained by providing a data communication method for performing data communication on a serial bus, comprising the steps of: executing an initial protocol; and if a protocol to be executed after the initial protocol is selected from plural types of protocols, selecting a specific protocol with priority.

Further, another object of the present invention is to provide a data communication apparatus and method which, in a network to which a plurality of target devices are connected, select a target device corresponding to an output purpose, to obtain appropriate output.

Further, another object of the present invention is to provide a data communication apparatus and method which reduce load due to protocol change in a multi-protocol environment.

According to the present invention, the foregoing objects are attained by providing a data communication method for performing data communication on a serial bus, comprising the steps of: searching for target devices connected to the serial bus; obtaining information on the target devices; generating a table of the target devices based on the obtained information; and selecting one of the target devices based on the generated table.

Further, the foregoing objects are attained by providing a data communication method for performing data communication on a serial bus, comprising the steps of: searching for target devices connected to the serial bus; obtaining information on the target devices; recognizing a network topology based on the obtained information; and selecting one of the target devices based on the recognized network topology.

Further, the foregoing objects are attained by providing a data communication method for performing data communication on a serial bus, comprising the steps of: searching for target devices connected to the serial bus; obtaining information on the target devices; generating a table of the target devices based on the obtained information; and selecting one of the target devices based on the generated table.

Further, the foregoing objects are attained by providing a data communication method for performing data communication on a serial bus, comprising the steps of: searching for target devices connected to the serial bus; obtaining information on the target devices; generating a table of the target devices based on the obtained information; determining a protocol to be used with priority, based on the generated table; and notifying the target devices connected to the serial bus of the determined protocol.

Other features and advantages of the present invention will be apparent from the following description taken in conjunction with the accompanying drawings, in which like reference characters designate the same name or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 3B is an example of the structure of a configuration ROM of a minimum format;

FIG. 3C is an example of the structure of the configuration ROM of a general format;

FIG. 11 is a flowchart showing a procedure of the bus arbitration;

FIG. 31 is an example of the format of a printer map in a network constricted by a 1394 serial bus;

FIG. 32 is an example of the format of unique ID's of nodes in a CSR architecture;

FIG. 33 is an example of the format of a printer-map generation command;

DETAILED DESCRIPTION OF THE PREFERRED EMBODIMENTS

Preferred embodiments of the present invention will now be described in detail in accordance with the accompanying drawings.

In the following first and second embodiments, a serial bus such as an IEEE 1394–1995 bus (High Performance Serial Bus) (hereinafter simply referred to as "1394 serial bus") is employed as a digital interface connecting the respective devices. Accordingly, the outline of the 1394 serial bus will be described.

Outline of 1394 Serial Bus

With the appearance of general digital video cam recorder (VCR) and digital video disk (DVD) player, there is a need for transferring realtime and large amount data such as video data and audio data (hereinafter referred to as "AV data"). To transfer AV data in realtime to a personal computer (PC) or other digital devices, an interface capable of high-speed data transfer is required. The 1934 serial bus has been developed from the above purpose.

Figure 1:
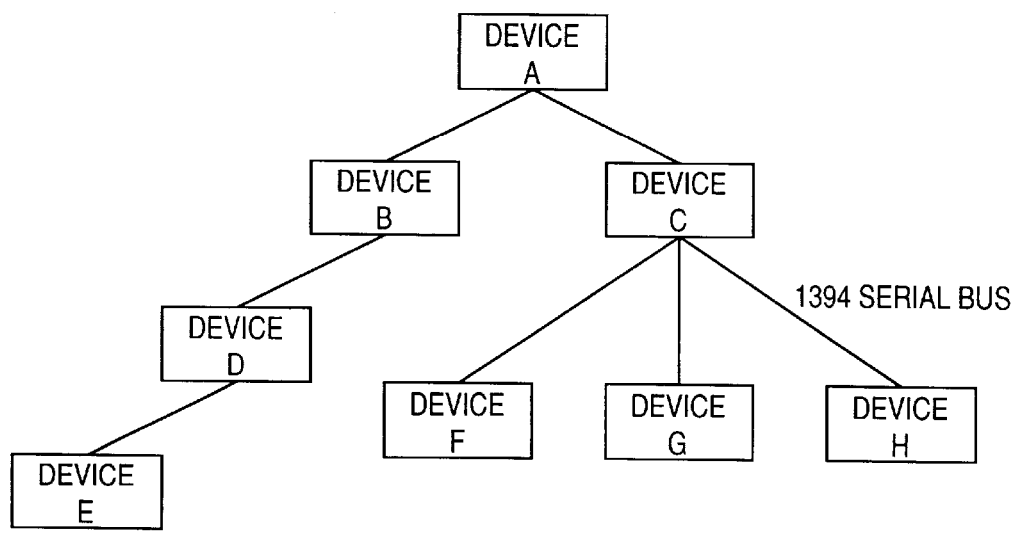
FIG. 1 is a block diagram showing an example of a network system constructed with an IEEE 1394 serial interface.

FIG. 1 shows an example of a network system constructed with a 1394 serial bus. This system comprises devices A to H, and the devices A and B, the devices A and C, the devices B and D, the devices D and E, the devices C and F, the devices C and G, and the device C and H are respectively connected by a twisted pair cable for the 1394 serial bus. These devices A to H may be computers such as a personal computer, or most computer-peripheral devices such as a digital VCR, a DVD player, a digital still camera, a storage device using a storage medium such as a hard disk or an optical disk, a monitor such as a CRT or an LDC, a tuner, an image scanner, a film scanner, a printer, a MODEM, and a terminal adapter (TA), a Set-Top-Box, a digital television, a conference camera, a digital video system and a complex machine of them.

The connection between the devices may be made by intermixing a daisy chain method and a node branching method, thus realizing high-freedom of connecting.

The respective devices have an ID, and they construct a network by identifying each ID within a range connected by the 1394 serial bus. For example, the devices, respectively, take a relaying role when connected in a daisy-chain with cables for the 1394 serial bus, thus constructing a network.

As the 1394 serial bus corresponds to Plug and Play function, it automatically recognizes a device connected to the cable, thus recognizes connection status. In the system as shown in FIG. 1, when a device is removed from the network, or a new device is added to the network, the bus is automatically reset (i.e., the current network constructing information is reset), and a new network is constructed. This function enables realtime setting and recognition of network construction.

The 1394 serial bus has a data transfer speed defined as 100/200/400 Mbps. A device having a high transfer speed supports a lower transfer speed, thus maintaining compatibility. As data transfer modes, an asynchronous transfer mode (ATM) for transferring asynchronous data such as control signals, an isochronous transfer mode for transferring isochronous data such as realtime AV data are available. In data transfer, within each cycle (generally 125 ms/cycle), a cycle start packet (CSP) indicating the start of cycle is transferred, and then asynchronous and isochronous data are mixedly transferred such that the isochronous data transfer is transferred prior to the asynchronous data.

Figure 2:
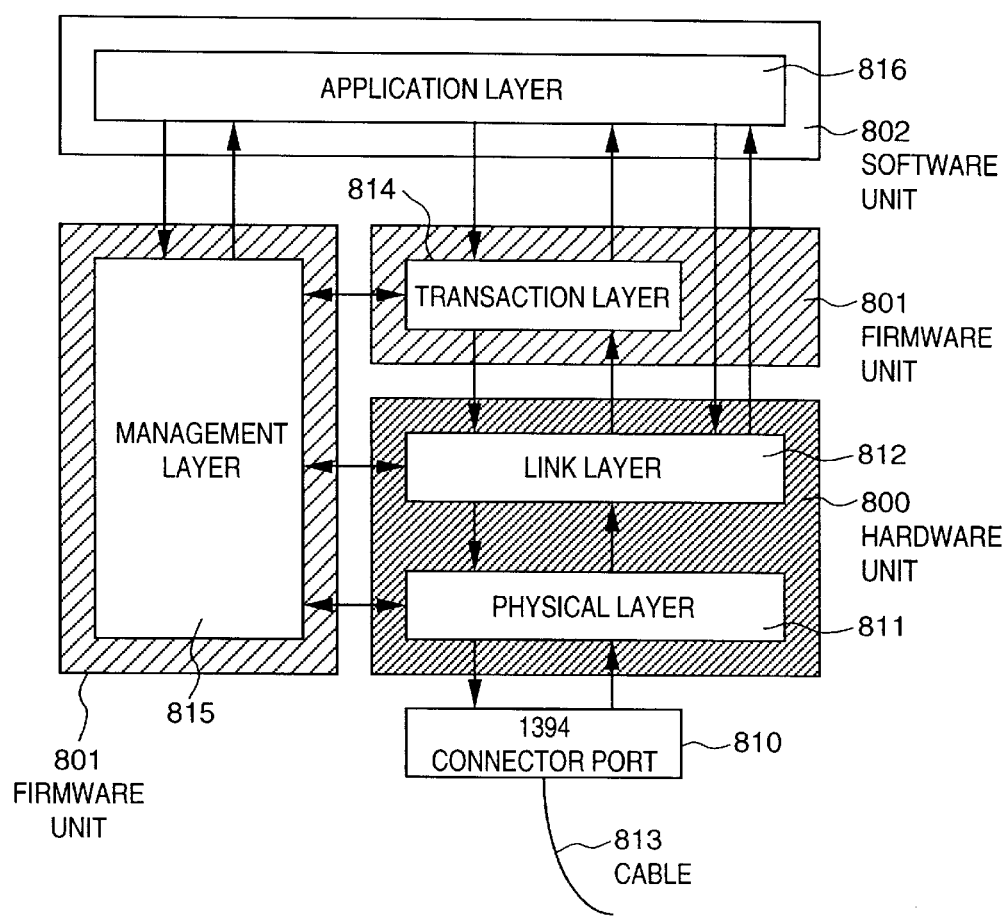
FIG. 2 is a block diagram showing the construction of the IEEE 1394 serial interface.

FIG. 2 shows the construction of the 1394 serial bus, as a layer structure. As shown in FIG. 2, a connector port 810 is connected to a connector at the end of a cable 813 for the 1394 serial bus. A physical layer 811 and a link layer 812 in a hardware unit 800 are positioned as upper layers with respect to the connector port 810. The hardware unit 800 comprises interface chips. The physical layer 811 performs coding, connection-related control and the like, and the link layer 812, packet transfer, cycle-time control and the like.

In a firmware unit 801, a transaction layer 814 manages data to be transferred (transaction data), and outputs commands Read, Write and Lock. A management layer 815 in the firmware unit 801 manages connection statuses and ID's of the respective devices connected to the 1394 serial bus, thus manages the network construction. The above hardware and firmware units substantially construct the 1394 serial bus.

In a software unit 802, an application layer 816, differs in software used by the system, and the data transfer protocol indicating how to transfer data on the interface is defined by a protocol such as a printer protocol or an AVC protocol.

Figure 3A:
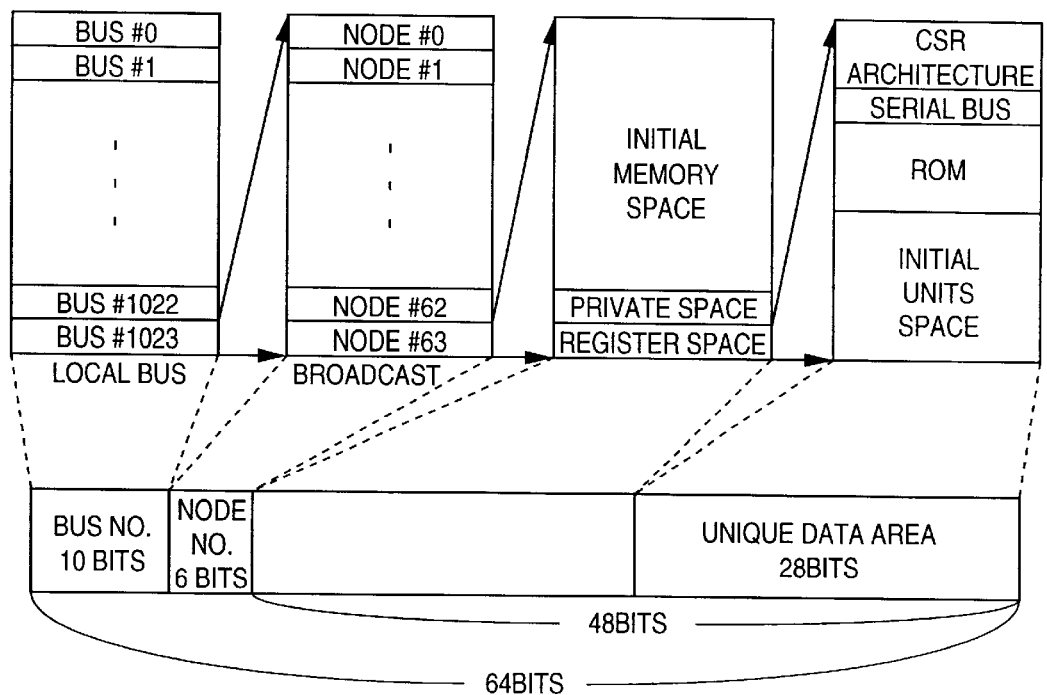
FIG. 3A is an explanatory view showing address space of the IEEE 1394 serial interface.

FIG. 3A shows address space of the 1394 serial bus. All the devices (nodes) connected to the 1394 serial bus have a unique 64 bit address. The 64 bit address is stored in a memory of the devices. Data communication with a designated destination device can be performed by recognizing the node addresses of the transmitting- and receiving-side nodes.

Addressing of the 1394 serial bus is made based on the IEEE 1212 standards, such that the first 10 bits are allocated for designating a bus number, then the next 6 bits are allocated for designating an node ID. The remaining 48 bits are allocated as an address space of each device, thus this area is used as unique address space. The last 28 bits are allocated as a data area unique to each device, where an identifier, designated condition of use and the like of each device are stored.

As a basic function of a CSR (Command/Status Register) architecture for node management, a CSR core as shown in FIG. 3A exists on the register. In FIG. 3A, the offset address is a relative position from "0xFFFFF0000000". In the CSR architecture, a register relating to the serial bus is arranged from "0xFFFFF0000200". Further, information on node resources of the serial bus is arranged from "0xFFFFF0000800".

The CSR architecture has a configuration ROM for representing functions of the respective nodes. The configuration ROM has a minimum format and a general format, arranged from "0xFFFFF0000400". As shown in FIG. 3B, the minimum format configuration ROM merely shows a vendor ID which is a unique numerical value represented by 24 bits. As shown in FIG. 3C, the general format configuration ROM has information on a node. The vendor ID in this format is included, together with information on the function of the node, in a "root_directory". Further, "bus_info_block" and "root&unit_leaves" include unique device number including the vendor ID, represented by 64 bits. The device number is used after network reconstruction by bus reset operation, to continue recognition of the node.

Figure 3D:
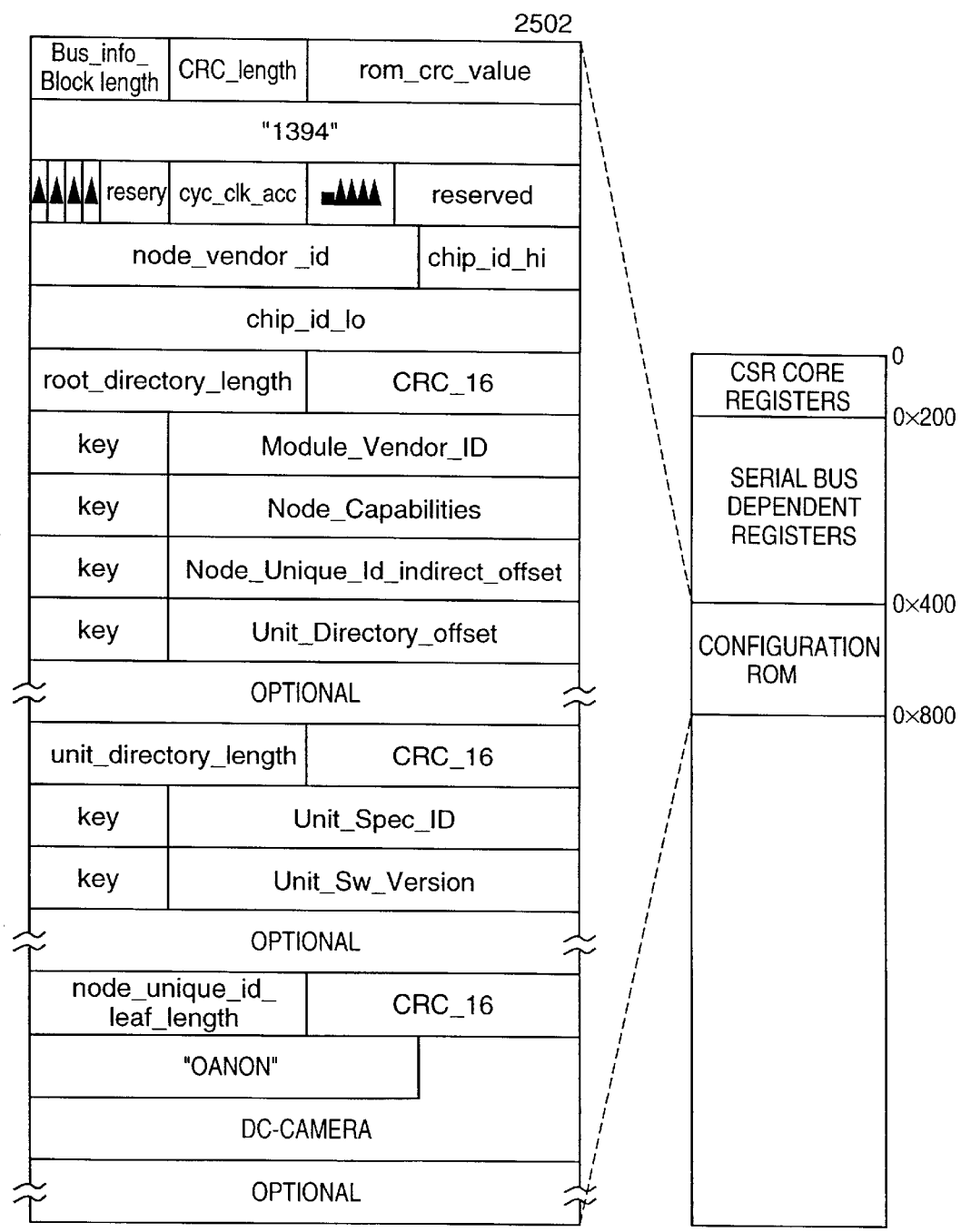
FIG. 3D is an example of the structure of the configuration ROM of a digital camera.

FIG. 3D shows an example of the configuration ROM of a digital camera. In FIG. 3D, the vendor ID is represented "node-vendor_id", "chip_id_hi" and "chip_id_lo", by 64 bits.

The 1394 serial bus has the construction as described above. Next, the features of the 1394 serial bus will be described in more detail.

Electrical Specification of 1394 Serial Bus

Figure 4:
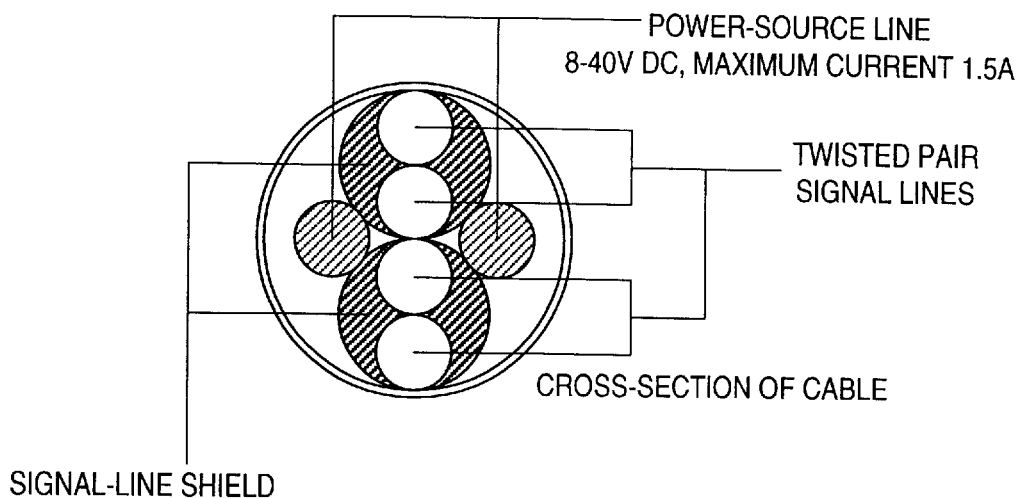
FIG. 4 is a cross-sectional view showing a cable for the IEEE 1394 serial interface.

FIG. 4 shows a cross-section of the cable of the 1394 serial bus. The 1394 serial cable comprises two sets of twisted pair signal lines and two power-source lines. This construction enables power supply to a device which lacks a power source, or a device where a voltage is degraded due to a failure or the like. The direct-current voltage supplied by the power-source lines is 8 to 40V; the current is maximum 1.5 A. Note that in the standards for so-called DV cable, four lines except the power-source line construct the cable.

DS-Link

Figure 5:
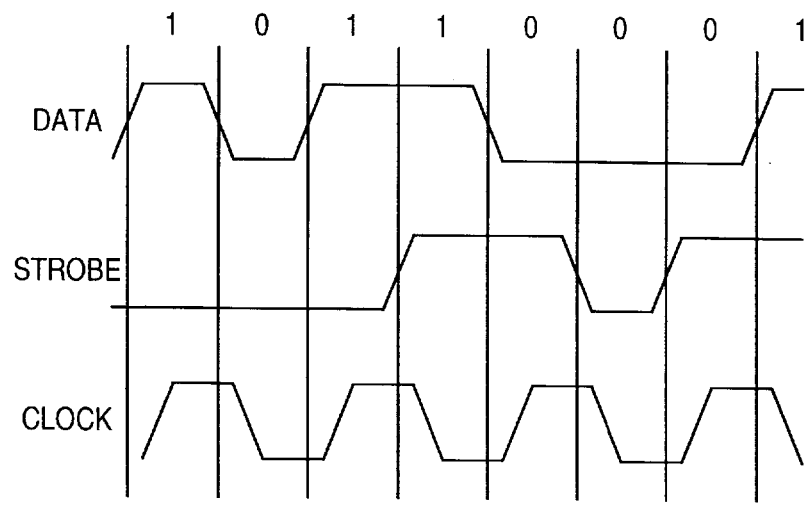
FIG. 5 is a timing chart explaining a Data/Strobe Link method.

FIG. 5 is a timing chart explaining a DS-Link (Data/Strobe-Link) method as a data transfer method.

The DS-Link method, appropriate for high-speed serial data communication, requires two sets of two signal lines. That is, one of the two sets of twisted-pair signal lines is used for sending a data signal, and the other one set of twisted-pair signal lines is used for sending a strobe signal. On the receiving side, an EXCLUSIVE-OR between the data signal and the strobe signal is obtained so as to generate a clock signal. In the DS-Link transfer, it is unnecessary to mix a clock signal into a data signal, therefore, transfer efficiency is higher than that in other serial-data transfer methods. Further, as a clock signal is generated from the data signal and the strobe signal, a phase locked loop (PLL) circuit can be omitted, which attains downsizing of the scale of a controller LSI. Further, in the DS-Link transfer, it is unnecessary to send information indicative of idle status when there is no data to be transferred, therefore, a transceiver of each device can be set in a sleep status, which reduces electric consumption.

Bus-Reset Sequence

The respective devices (nodes) connected to the 1394 serial bus are provided with a node ID, and are recognized as nodes constructing the network. For example, when increase/decrease of the number of nodes due to connection/disconnection or power ON/OFF status of network devices, i.e., network construction changes and it is necessary to recognize a new network construction, the respective nodes detect the change of network construction, send a bus-reset signal onto the bus, and enter a mode for recognizing the new network construction. The detection of change of network construction is made by detecting change of bias voltage at the connector port 810.

When the bus-reset signal is sent from one node, the physical layer 811 of the respective nodes receives the bus-reset signal, and at the same time, notifies the link layer 812 of the occurrence of bus reset, and forwards the bus-reset signal to the other nodes. When all the nodes have received the bus-reset signal, a bus-reset sequence is started. Note that the bus-reset sequence is started when the cable is attached/detached, or the hardware unit 800 has detected network abnormity or the like. Further, the bus-reset sequence is also started by a direct instruction to the physical layer 811 such as host control by a protocol. As the bus-reset sequence is started, data transfer is suspended during the bus reset, and after the bus reset, the data transfer is restarted in the new network construction.

Node-ID Determination Sequence

After the bus reset, the respective nodes start to obtain a node ID so as to construct a new network construction. A general sequence from the bus reset to node-ID determination will be described with reference to the flowcharts of FIGS. 6 to 8.

Figure 6:
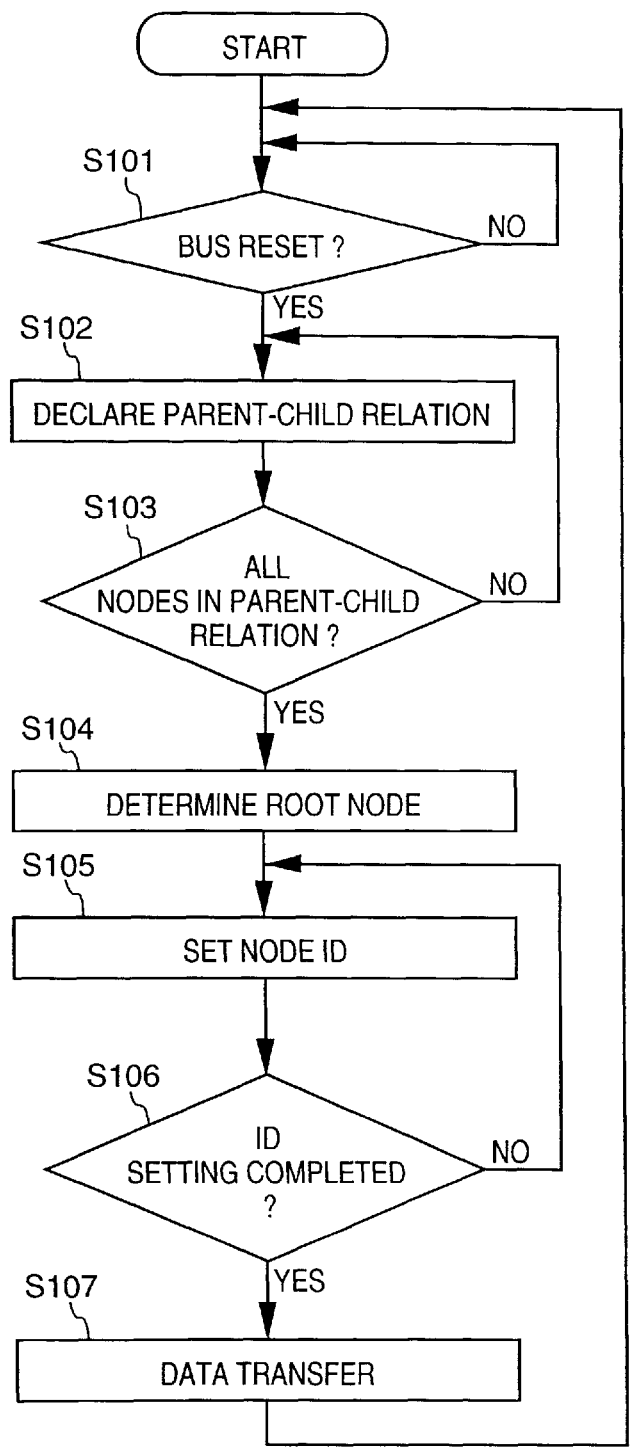
FIGS. 6 to 8 are flowcharts showing a procedure of network construction in the IEEE 1394 serial interface.

FIG. 6 is a flowchart showing a sequence from occurrence of bus-reset signal to node-ID determination and data transfer. At step S101, the respective nodes always monitor occurrence of bus-reset signal. When the bus-reset signal has occurred, the process proceeds to step S102, at which to obtain a new network construction in a state where the network construction has been reset, parent-child relation is declared between nodes connected to each other. Step S102 is repeated until it is determined at step S103 that the parent-child relation has been determined among all the nodes.

As the parent-child relation has been determined, the process proceeds to step S104, at which one "root (node)" is determined. At step S105, node-ID setting is performed so as to provide an ID to the respective nodes. The node-ID setting is made in a predetermined order of the nodes. Step S105 is repeated until it is determined at step S106 that the ID's have been given to all the nodes.

As the node-ID setting has been completed, since the new network construction has been recognized by all the nodes, data transfer among the nodes is possible. At step S107, data transfer is started, and the process returns to step S101, at which occurrence of bus-reset signal is monitored again.

Figure 7:
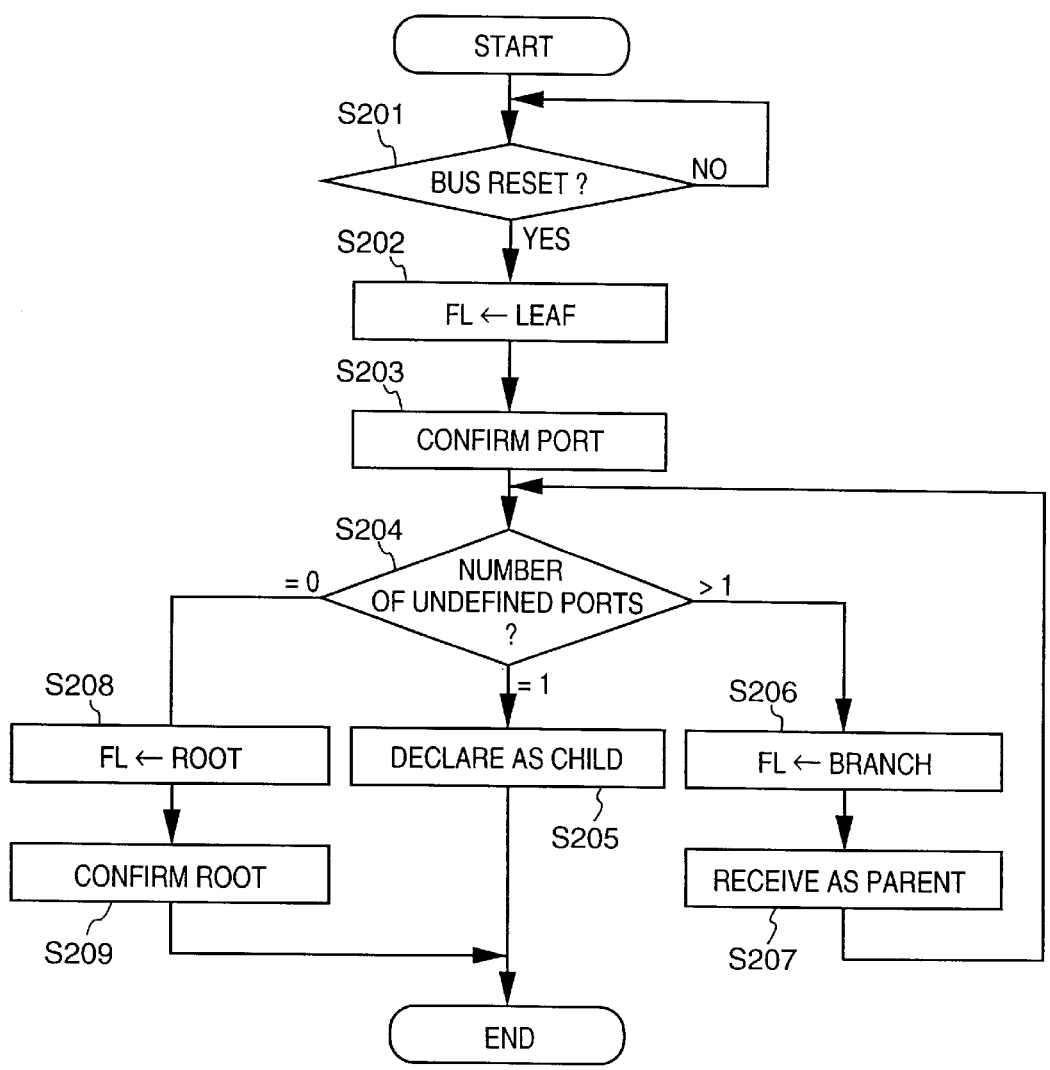
Figure 8:
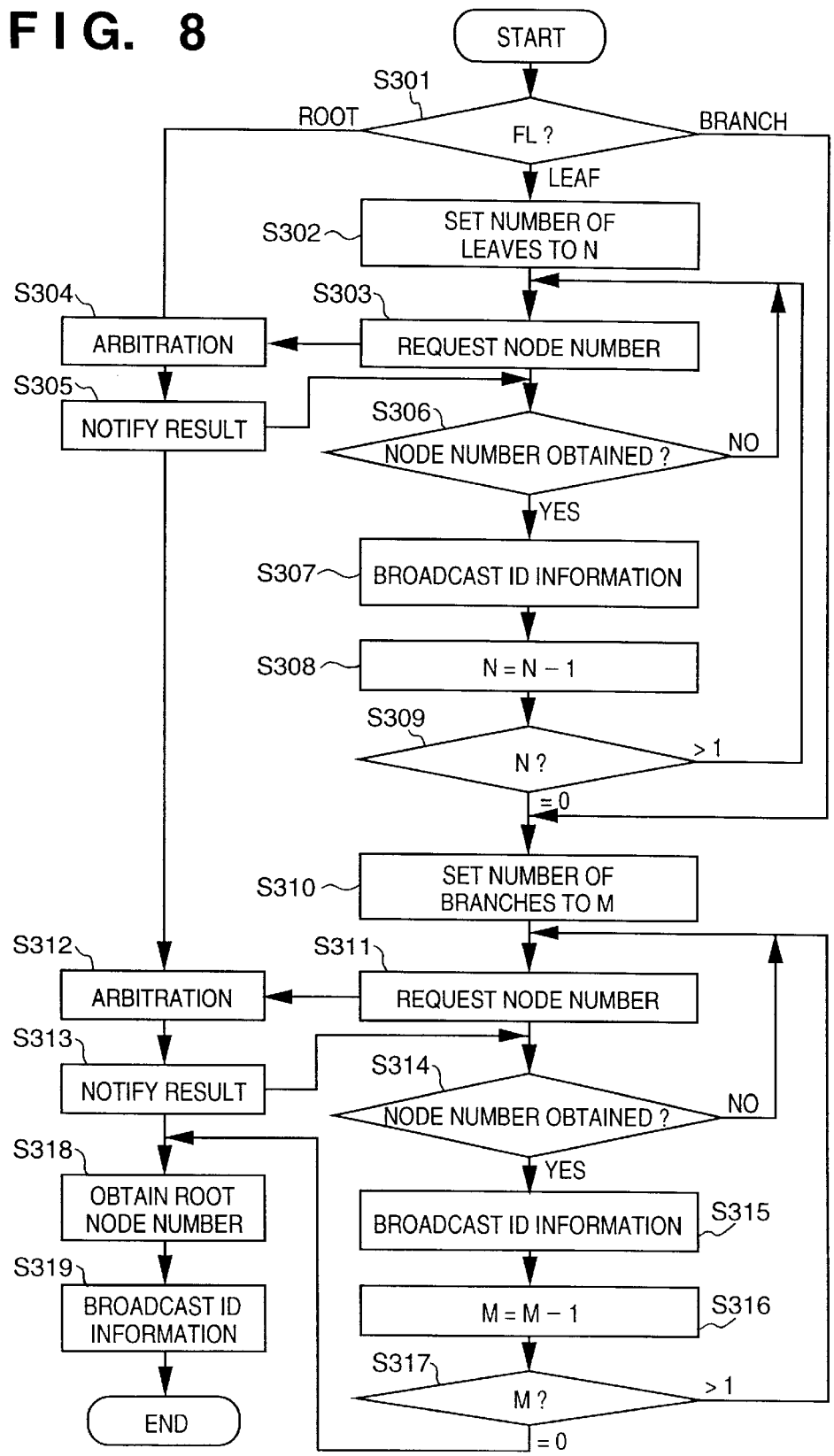

FIG. 7 is a flowchart showing the sequence from the monitoring of bus-reset signal (S101) to the root determination (S104) in detail. FIG. 8 is a flowchart showing the node-ID setting (S105 and S106) in detail.

In FIG. 7, at step S201, the occurrence of bus-reset signal is monitored, and as the bus-reset signal has occurred, the network construction is reset. Next, at step S202, as a first step for re-recognizing the reset network construction, the respective devices reset its flag FL with data indicative of "leaf (node)". At step S203, the respective devices examine the number of ports, i.e., the number of other nodes connected to them. At step S204, based on the result of examination at step S203, the devices examine the number of undefined (i.e., parent-child relation has not been determined) ports. The number of undefined ports is equal to that of the ports immediately after the bus reset, however, with the progress of determination of parent-child relation, the number of undefined ports detected at step S204 decreases.

Only actual leaf(ves) can declare parent-child relation immediately after the bus reset. Whether or not the node is a leaf is detected from the number of ports examined at step S203; i.e., if the number of ports is "1", the node is a leaf. The leaf declares that "this node is a child, and the connected node is a parent" at step S205, then terminates the operation.

On the other hand, a node that detected at step S203 that the number of ports is "two or more" is a "branch". Immediately after the bus reset, as "undefined ports>1" holds, the process proceeds to step S206, at which the flag FL is set with data indicative of "branch", then declaration of parent-child relation from another node is waited at step S207. When the parent-child relation is declared from another node, the process returns to step S204 at which the branch examines the number of undefined ports. If the number of undefined ports is "1", the branch can declare at step S205 that "this node is a child, and the connected node is a parent" to the node connected to the remaining port. If the number of undefined ports is still "two or more", the branch waits for declaration of parent-child relation from another node at step S207.

When any one of the branches (or exceptionally leaf(ves) which delayed declaring a child) detects that the number of undefined ports is "0", the parent-child declaration of the overall network has been completed. The only node that has "0" undefined port, i.e., the parent of all the nodes, sets the flag FL with data indicative of a "root" at step S208. Then at step S209, the node is recognized as a root.

In this manner, the procedure from the bus reset to the parent-child declaration among all the nodes in the network ends.

Next, a procedure of providing each node with an ID will be described. First, the ID setting is performed at the leaves. Then, ID's are set in numerical order (from node number: 0) from leaves→branches→root.

In FIG. 8, at step S301, the process splits in accordance with node type, i.e., leaf, branch or root, based on the data set at the flags FL.

In case of leaf, at step S302, the number of leaves (natural number) in the network is set to a variable N. At step S303, the respective leaves request a node number to the root. If a plurality of requests have been made, the root performs arbitration at step S304, and provides a node number to one node at step S305, while notifies the other nodes of the result of acquisition of node-number indicating that the node number has been failed.

A leaf that has not obtained a node number (NO at step S306) repeats the request for node number at step S303. On the other hand, a leaf that has obtained a node number notifies all the nodes of the obtained node number by broadcasting ID information including the node number. As the broadcasting of the ID information has been completed, the variable N indicative of the number of leaves is decremented at step S308. Then, from the determination at step S309, the procedure from step S303 to step S308 is repeated until the variable N becomes "0" in the determination at step S309. When ID information on all the leaves have been broadcasted, the process proceeds to step S310, for setting ID's of branches.

The ID setting for branches is performed substantially similar to the ID setting for the leaves. First, at step S310, the number of branches (natural number) is set to a variable M. At step S311, the respective branches request the root for a node number. In response to the requests, the root performs arbitration at step S312, and provides a node number, subsequent to the last leaf node number, to a branch at step S313, while notifies the other branches of the result of acquisition of node-number indicating that the node number has been failed.

A branch that has not obtained a node number (NO at step S314) repeats the request for node number at step S315. On the other hand, a branch that has obtained a node number notifies all the nodes of the obtained node number by broadcasting ID information including the node number. As the broadcasting of the ID information has been completed, the variable M indicative of the number of branches is decremented at step S316. Then, from the determination at step S317, the procedure from step S311 to step S316 is repeated until the variable M becomes "0" in the determination at step S317. When ID information on all the leaves have been broadcasted, the process proceeds to step S318, for setting the ID of the root.

At this time, it is only the root that has not obtained a node ID. At step S318, the root obtains the smallest number that has not been provided to any other node as the node ID of the root, and at step S319, broadcasts ID information on the root.

As described above, the procedure until the node ID's for all the nodes have been set ends. Next, the sequence of node ID determination will be described with reference to the network example shown in FIG. 9.

Figure 9:
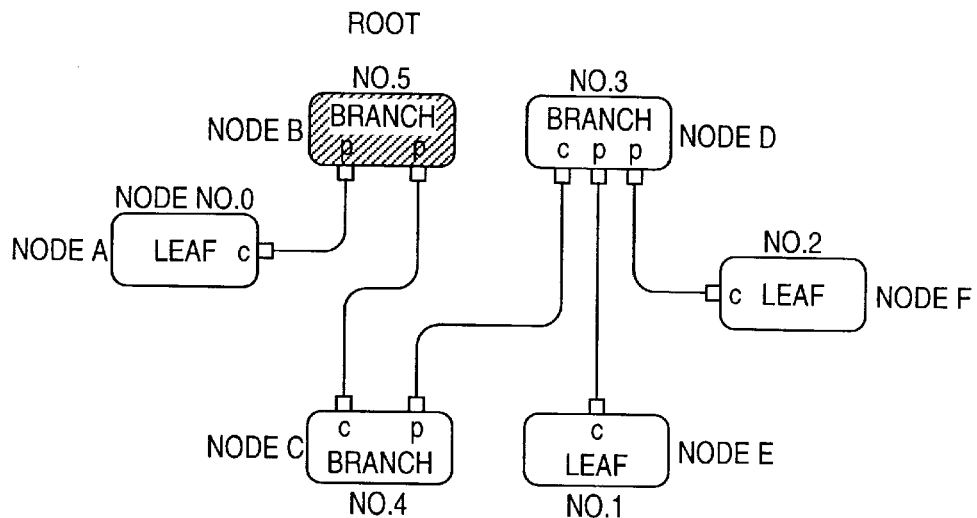
FIG. 9 is a block diagram showing an example of the network.

In the network in FIG. 9, a node B as a root is directly connected to its lower nodes A and C; the node C is directly connected to its lower node D; and the node D is directly connected to its lower nodes E and F. The procedure of determining this hierarchical structure, the root node and the node ID's will be described below.

After the bus reset has occurred, to recognize connection statuses of the respective nodes, parent-child relation is declared between ports of directly connected nodes. "parent" means a node at an upper level and "child" means a node at a lower level in the hierarchical structure. In FIG. 9, the node that first declared parent-child relation after the bus reset is the node A. As described above, nodes (leaves) where only one port is connected can start declaration of parent-child relation. That is, if the number of ports is "1", it is recognized that the node is the end of the network tree, i.e., a leaf. The declaration of parent-child relation is started from the leaf which has first taken action among these leaves. Thus, a port of the leave node is set as a "child", while the port of another node connected to the leave node is set as a "parent". In this manner, "child-parent" relation is sequentially set between the nodes A and B, between the nodes E and D, and between the nodes F and D.

Further, among upper nodes having a plurality of ports, i.e., branches, parent-child relation is sequentially declared with respect to upper node(s), from the node that first received declaration of parent-child relation from the leaf. In FIG. 9, first parent-child relation is determined between the nodes D and E and between the nodes D and F. Then the node D declares parent-child relation with respect to the node C, and as a result, a relation "child-parent" is set between the nodes D and C. The node C, that has received the declaration of parent-child relation from the node D, declares parent-child relation with respect to the node B connected to the other port, thus "child-parent" relation is set between the nodes C and B.

In this manner, the hierarchical structure as shown in FIG. 9 is constructed. The node B, that has finally become the parent at all the ports, is determined as a root. Note that a network has only one root. In a case where the node B that has received declaration of parent-child relation from the node A immediately declares parent-child relation with respect to another node, the other node, e.g., the node C, may be the root node. That is, any node may be a root depending upon timing of transmitting declaration of parent-child relation, and further, even in a network maintaining the same construction, a particular node is not always become a root.

As the root has been determined, the sequence of determining the respective node ID's is started. Each node has a broadcast function to notify its ID information to all the other nodes. ID information includes a node number, information on a connected position, the number of ports, the number of ports connected to other nodes, information on parent-child relation on the respective ports and the like.

As described above, the assignment of node numbers is started from the leaves. In numerical order, node number=0, 1, 2, . . . is assigned. Then, by the broadcasting of ID information, it is recognized that the node number has been assigned.

As all the leaves have obtained a node number, node numbers are assigned to the branches. Similar to the assignment of node numbers to the leaves, ID information is broadcasted from the branch that received a node number, and finally, the root broadcasts its ID information. Accordingly, the root always has the larger node number.

Thus, as the ID setting of the overall hierarchical structure has been completed and the network has been constructed, then the bus initialization is completed.

Bus Arbitration

The 1394 serial bus always performs arbitration of bus use right prior to data transfer. The devices connected to the 1394 serial bus respectively relay a signal transferred on the network, thus constructing a logical bus-type network transmitting the signal to all the devices within the network. This necessitates bus arbitration to avoid packet conflict. As a result of bus arbitration, one node can transfer data during a certain period.

Figure 10A:
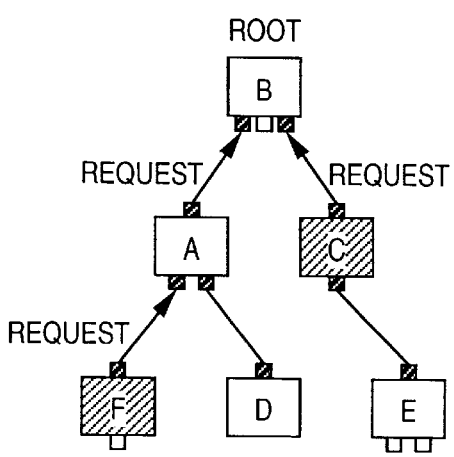
FIGS. 10A and 10B are block diagrams explaining bus arbitration.
Figure 10B:
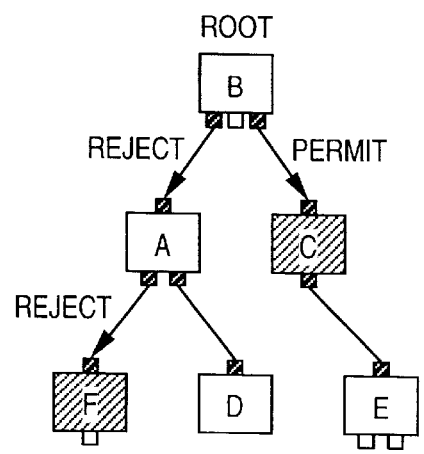

FIGS. 10A and 10B are block diagrams explaining the bus arbitration. FIG. 10A shows operation to request a bus use right; and FIG. 10B, operation to allow to use the bus.

When the bus arbitration is started, a single or plurality of nodes respectively request a bus use right to use the bus to its parent node. In FIG. 10A, the nodes C and F request a bus use right. The parent node (node A in FIG. 10A) that has received the request relays the request by further requesting a bus use right to its parent node. The request is forwarded to a root (node B in FIG. 10A) that finally performs arbitration.

The root that has received the request for bus use right determines the node to be provided with the bus use right. This arbitration can be performed only by the root. The node that dominated in the arbitration is provided with the bus use right. FIG. 10B shows that the node C has obtained the bus use right and the request from the node F has been rejected.

The root sends a DP (data prefix) packet to nodes that lost in the bus arbitration so as to notify that their requests have been rejected. The requests from those nodes are held by the next bus arbitration.

Thus, the node that obtained the bus use permission starts data transfer.

The sequence of the bus arbitration will be described with reference to the flowchart of FIG. 11.

To start data transfer by a node, the bus must be in idle status. To confirm that data transfer has been completed and the bus is currently in idle status, each node detects a gap length of a predetermined idle period (e.g., subaction gap) set in each transfer mode, and it determines whether or not the bus is currently in idle status based on the detection result.

At step S401, the node determines whether or not a predetermined gap length corresponding to asynchronous data or isochronous data to be transferred has been detected. So far as the node has not detected the predetermined gap length, it cannot request a bus use right to start data transfer, accordingly, the node waits until the predetermined gap length has been detected.

When the predetermined gap length has been detected at step S401, the node determines whether or not there is data to be transferred at step S402. If YES, it issues a signal requesting a bus use right to the root at step S403. As shown in FIG. 10A, this signal requesting the bus use right is relayed by the respective devices in the network, and forwarded to the root. If it is determined at step S402 that there is no data to be transferred, the process returns to step S401.

At step S404, if the root has received a single or plurality of request signals for the bus use right, it examines the number of nodes requesting the bus use right at step S405. From the determination at step S405, if the number of the nodes requested the bus use right is one, that node is provided with bus use permission immediately after the requirement. On the other hand, if the number of the nodes is more than one, arbitration is performed to determine one node to be provided with the bus use right immediately after the requirement. The arbitration does not always provide a bus use right to the same node, but equally provides a bus use right to the respective nodes (fair arbitration).

The processing at the root branches at step S407 into processing for the node dominated in the arbitration at step S406, and processing for the other nodes lost in the arbitration. In a case where there is one node that requested the bus use right, or one node has dominated in the arbitration, the node is provided with a permission signal indicative of bus use permission at step S408. The node starts data (packet) transfer immediately after it receives the permission signal (step S410). On the other hand, the nodes that lost in the arbitration receive a DP (data prefix) packet indicative of rejection of the bus use request at step S409. The processing for the node that received the DP packet returns to step S401 to request a bus use right again. Also, the processing for the node that completed data transfer at step S410 returns to step S401.

Asynchronous Transfer

Figure 12:
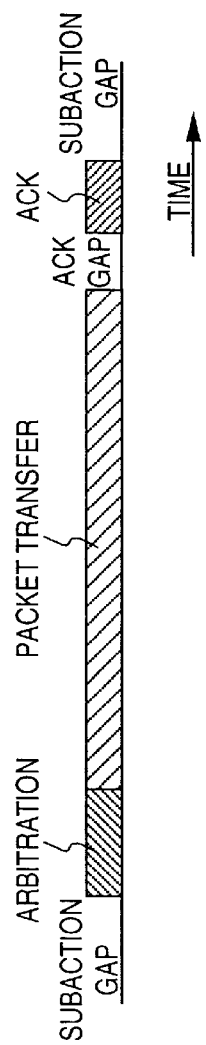
FIG. 12 is a timing chart showing transitional statuses in asynchronous data transfer.

FIG. 12 shows sequence in the asynchronous transfer. In FIG. 12, the first subaction gap represents the idle status of the bus. At a point where the idle time has become a predetermined value, a node which desires to perform data transfer requests a bus use right, then bus arbitration is executed.

When the use of bus has been allowed by the arbitration, data in the form of packet is transferred, and the node which receives the data sends a reception acknowledgment code ACK as a response, or sends a response packet after a short gap called ACK gap, thus the data transfer is completed. The code ACK comprises 4-bit information and a 4-bit checksum. The code ACK, including information indicative of success, busy or pending status, is immediately sent to the data-sender node.

Figure 13:
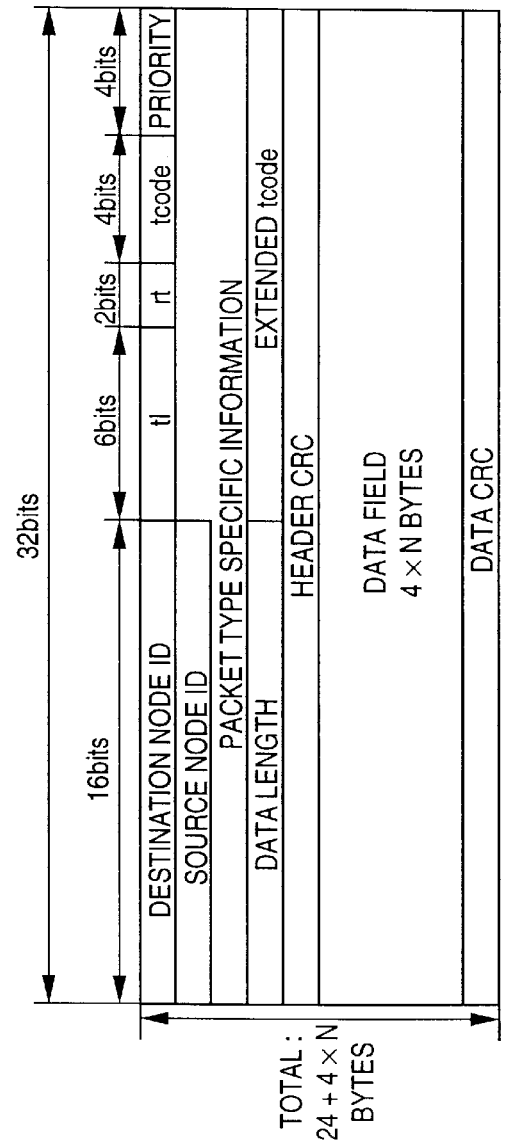
FIG. 13 is a diagram showing a packet format for the asynchronous transfer.

FIG. 13 shows a packet format for asynchronous transfer. The packet has a data area, a data CRC area for error correction, and a header area in which a destination node ID, a source node ID, a transfer data length and various codes are written.

The asynchronous transfer is a one-to-one communication from a sender node to a receiver node. A packet sent from the sender node is relayed by the respective nodes in the network, however, as these nodes are not designated as the receiver of the packet, they ignore the packet, then only the receiver node designated by the sender node receives the packet.

Isochronous Transfer

Isochronous transfer, which can be regarded as the greatest feature of the 1394 serial bus is appropriate to multimedia data transfer which requires realtime transfer of, especially, AV data.

Further, the asynchronous transfer is a one-to-one transfer, whereas the isochronous transfer is a broadcasting transfer from one sender node to all the other nodes.

Figure 14:
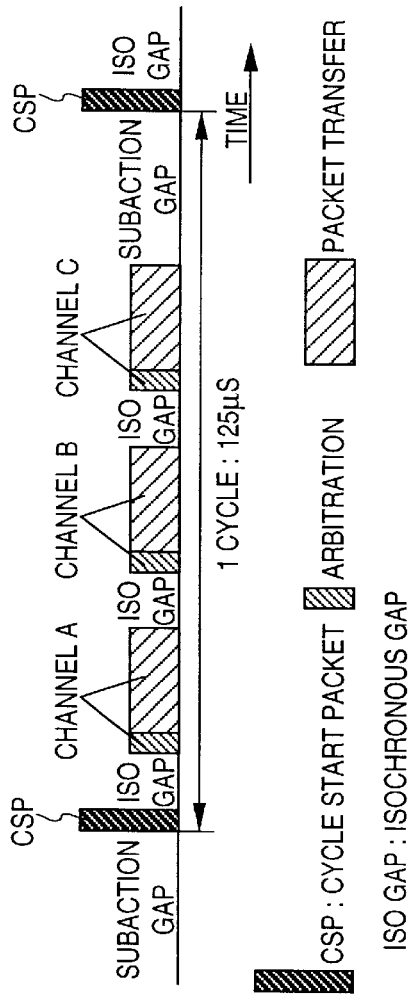
FIG. 14 is a timing chart showing transitional statuses in isochronous data transfer.

FIG. 14 shows transition in the isochronous transfer. The isochronous transfer is executed on the bus in a predetermined cycle, called "isochronous cycle". The period of the isochronous cycle is 125 ms. A cycle start packet (CSP) indicates the start of the isochronous cycle for synchronizing the operations of the respective nodes. When data transfer in a cycle has been completed and a predetermined idle period (subaction gap) has elapsed, a node which is called "cycle master" sends the CSP indicative of the start of the next cycle. That is, this interval between the issuance of CSP's is 125 ms.

As channel A, channel B and channel C in FIG. 14, the respective packets are provided with a channel ID, so that plural types of packets can be independently transferred within one isochronous cycle. This enables substantially-realtime transfer among the plural nodes. The receiver node can receive only data with a predetermined channel ID. The channel ID does not indicate an address of the receiving node, but merely indicates a logical number with respect to the data. Accordingly, one packet sent from a sender node is transferred to all the other nodes, i.e., broadcasted.

Similar to the asynchronous transfer, bus arbitration is performed prior to the packet broadcasting in isochronous transfer. However, as the isochronous transfer is not one-to-one communication like the asynchronous transfer, the reception acknowledgment code ACK used as a response in the asynchronous transfer is not used in the isochronous transfer.

Further, an isochronous gap (iso gap) in FIG. 14 represents an idle period necessary for confirmation prior to isochronous transfer that the bus is in idle status. If the predetermined idle period has elapsed, bus arbitration is performed with respect to node(s) desiring isochronous transfer.

Figure 15:
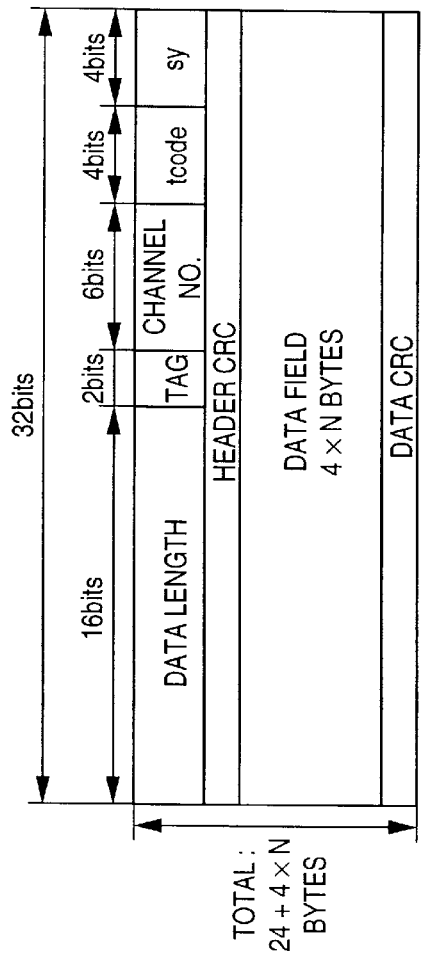
FIG. 15 is a diagram showing a packet format for the isochronous transfer.

FIG. 15 shows a packet format for isochronous transfer. Various packets divided into channels respectively have a data field, a data CRC field for error correction and a header field containing information such as a transfer-data length, a channel No., various codes and error-correction header CRC as shown in FIG. 15.

Bus Cycle

Figure 16:
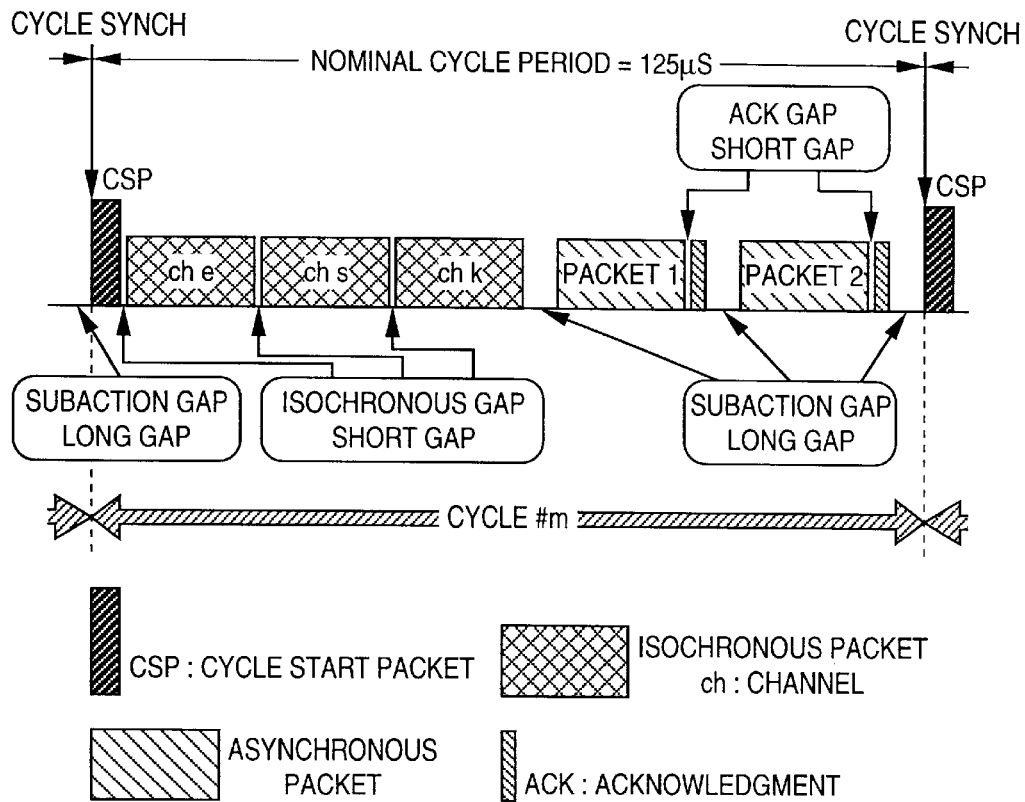
FIG. 16 is a timing chart showing transitional statuses in data transfer on the bus when the isochronous transfer and asynchronous transfer are mixedly performed.

In practice, both isochronous transfer and asynchronous transfer can be mixedly performed on the 1394 serial bus. FIG. 16 shows transition in the isochronous transfer and asynchronous transfer mixedly performed on the 1394 serial bus.

The isochronous transfer is performed prior to the asynchronous transfer because after the CSP, the isochronous transfer can be started with a gap (isochronous gap) shorter than the idle period necessary for starting the asynchronous transfer. Accordingly, the isochronous transfer has priority over the asynchronous transfer.

In the typical bus cycle as shown in FIG. 16, upon starting the cycle #m, a CSP is transferred from the cycle master to the respective nodes. The operations of the respective nodes are synchronized by this CSP, and node(s) that waits for a predetermined idle period (isochronous gap) to perform isochronous transfer participates in bus arbitration, then starts packet transfer. In FIG. 16, a channel e, a channel s and a channel k are transferred by the isochronous transfer.

The operation from the bus arbitration to the packet transfer is repeated for the given channels, and when an isochronous transfer in the cycle #m has been completed, an asynchronous transfer can be performed. That is, when the idle period has reached the subaction gap for the asynchronous transfer, node(s) that is to perform the asynchronous transfer participates in bus arbitration. Note that only if the subaction gap for starting the asynchronous transfer is detected, after the completion of isochronous transfer and before the next timing to transfer the CSP (cycle synch), the asynchronous transfer can be performed.

In the cycle #m in FIG. 16, the isochronous transfer for three channels is performed, and then two packets (packet 1 and packet 2) including ACK are transferred by the asynchronous transfer. When the asynchronous packet 2 has been transferred, as the next cycle synch point to start the subsequent cycle m+1 comes, the transfer in the cycle #m ends. Note that during the asynchronous or isochronous transfer, if the next cycle synch point to transfer the next CSP has come, the transfer is not forcibly stopped but continued. After the transfer has been completed, a CSP for the next cycle is transferred after a predetermined idle period. That is, when one isochronous cycle is continued for more than 125 ms, the next isochronous cycle is shorter than the reference period 125 ms. In this manner, the isochronous cycle can be lengthened or shortened based on the reference period 125 ms.

However, it may be arranged such that the isochronous transfer is performed in every cycle, while the asynchronous transfer is sometimes postponed until the next cycle or the cycle further subsequent to the next cycle, so as to maintain realtime transfer. The cycle master also manages information on such delay.

First Embodiment

Next, a first embodiment of the present invention will be described.

Figure 17:
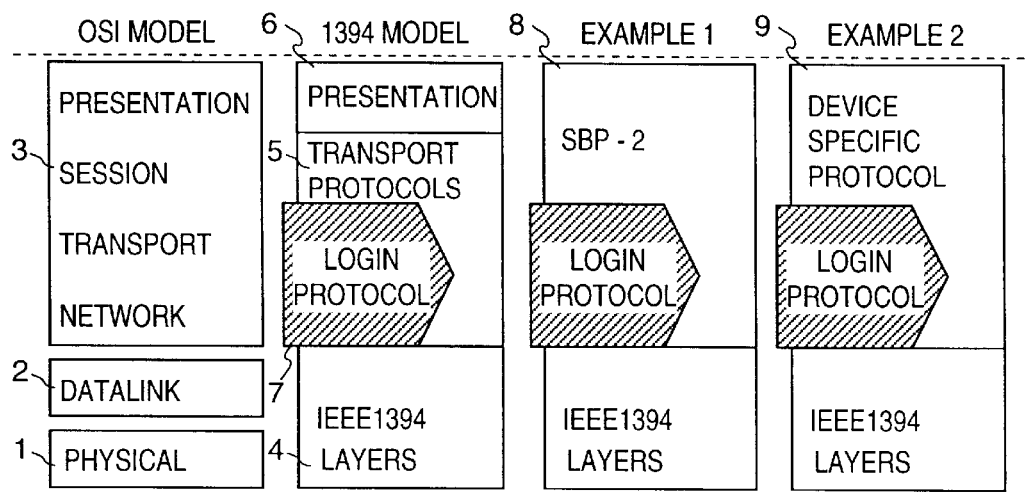
FIG. 17 is a schematic view showing the IEEE 1394 serial interface in comparison with an OSI model.

FIG. 17 shows the interface of the 1394 serial bus in comparison with respective layers of an OSI model often used in a LAN. In the OSI model, a physical layer 1 and a data link layer 2 respectively correspond to a physical layer 811 and a link layer 812 (both shown in FIG. 2) in a lower layer 4 of the 1394 serial bus interface. In the 1394 serial bus interface, a transport protocol layer 5 and a presentation layer 6 as upper layers correspond to an upper layer 3 of OSI model including a network layer, a transport layer, a session layer and a presentation layer. Further, a LOGIN protocol 7, which is the feature of the present invention, operates between the lower layer 4 and the transport protocol layer 5 of the 1394 serial bus interface.

In Example 1 in FIG. 17, by providing the LOGIN protocol 7 to a device based on a serial bus protocol (SBP-2) 8 for a peripheral device such as a printer, the peripheral device uses a protocol based on the protocol SBP-2 to notify a target device of data transfer with the target device. In Example 2, with respect to a device protocol 9 specialized on the 1394 serial bus interface, by providing the LOGIN protocol 7 to respective devices, the devices can determine whether or not the target device supports their protocol, with each other.

Figure 18:
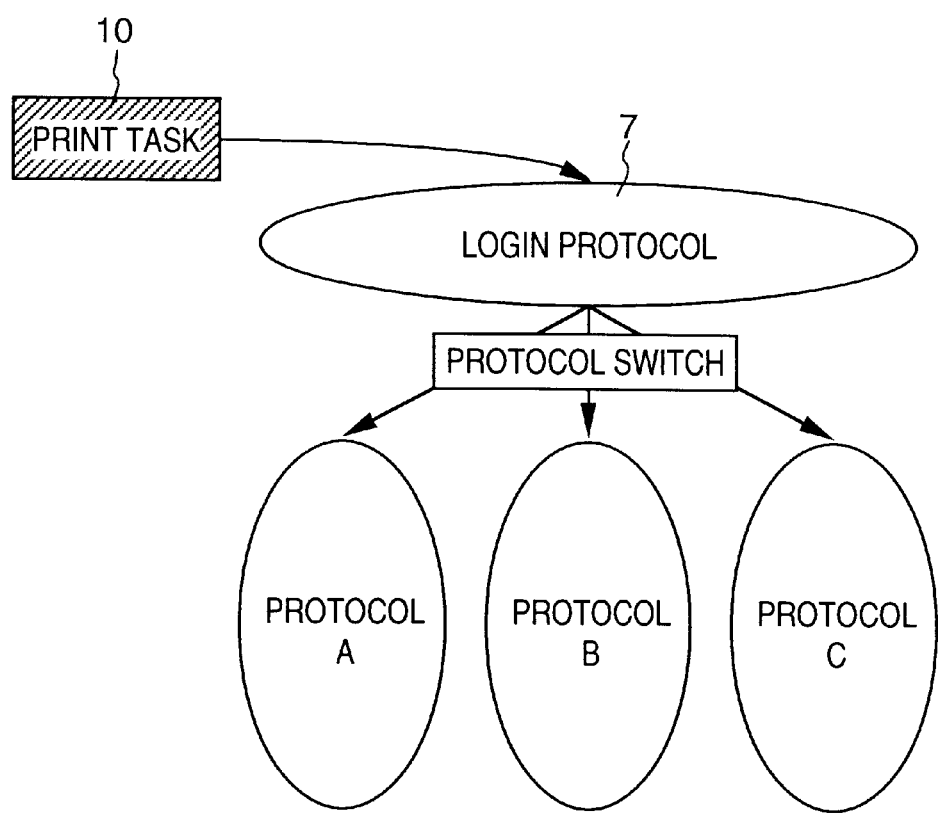
FIG. 18 is an explanatory view showing the basic operation of a LOGIN protocol.

FIG. 18 shows the basic operation of the LOGIN protocol. When a printer device executes a print task 10 from a host device, the printer device first selects one of printer protocols A to C for data communication, based on communication by the LOGIN protocol 7. Thereafter, the printer device performs print data transfer in accordance with the selected printer protocol. That is, upon connection between the printer device which supports a plurality of printer protocols and a host device, the printer device first judges the transport protocol 5 of the host device based on the LOGIN protocol 7, selects a printer protocol corresponding to the transport protocol 5 of the host device, and performs transfer/reception of print data or commands in accordance with the selected printer protocol, thus performs the print task 10.

Figure 19:
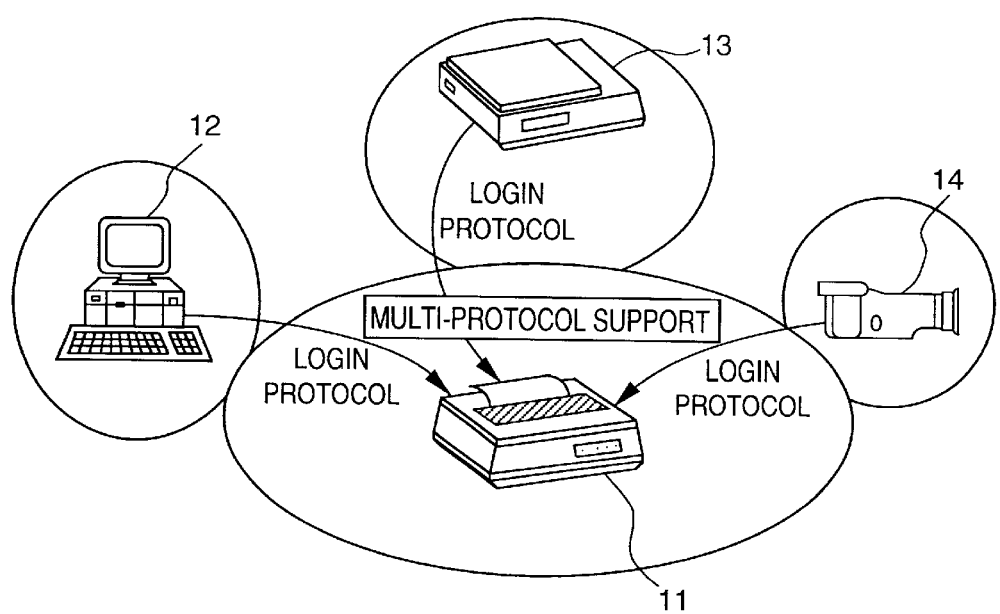
FIG. 19 is an explanatory view showing connection status in the IEEE 1394 serial interface.

FIG. 19 shows connection status in the 1394 serial bus, where devices (PC12, scanner 13 and VCR 14 etc.) with the LOGIN protocol 7 are connected to a printer 11 corresponding to plurality of printer protocols. The printer 11 can process print tasks from the respective devices by changing the printer protocol in accordance with the transport protocol 5 of a device that requests connection with the printer device.

Figure 20:
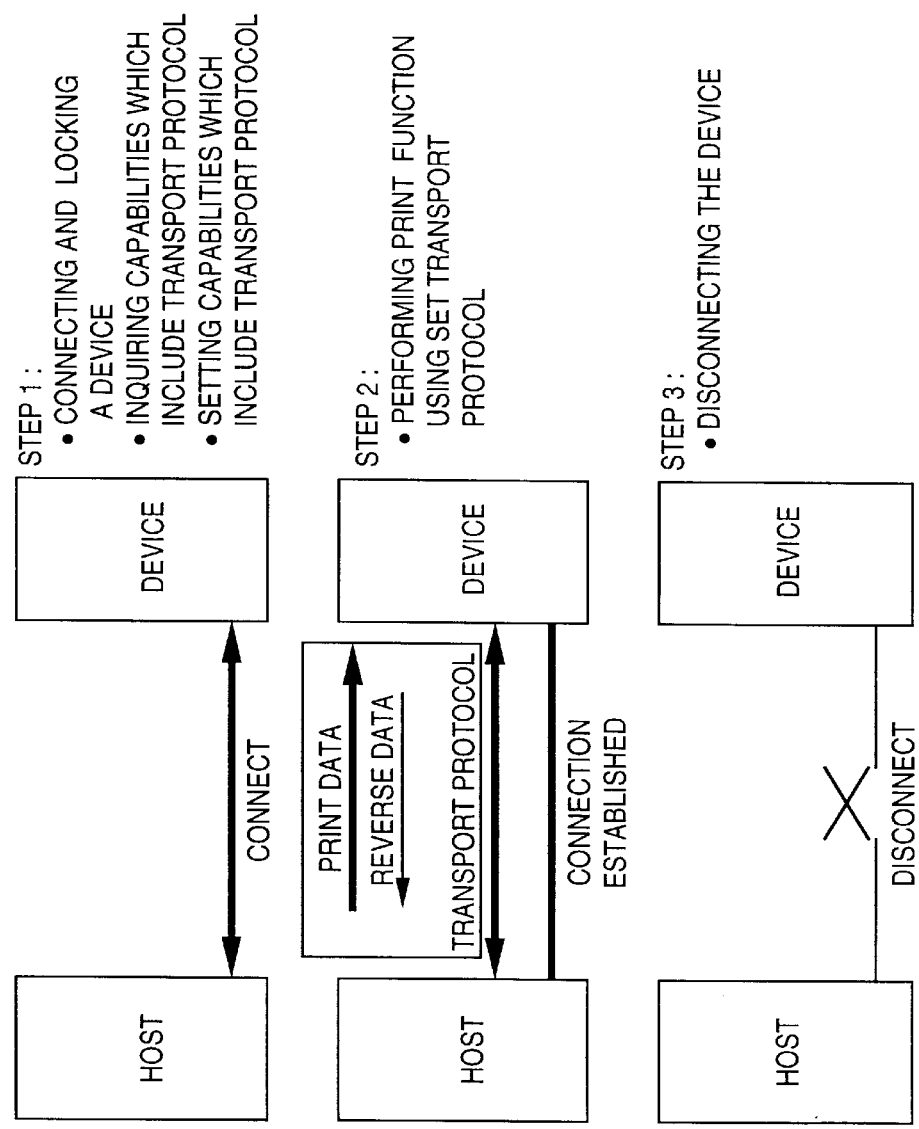
FIG. 20 is a timing chart showing the flow of log-in operation.

FIG. 20 shows the flow of log-in operation.

At STEP 1:

The host device locks a target device (a multi-protocol printer in this case).

The target device examines the capability of the host device (including the transport protocol). Note that the capability has been stored in a capability register 503 (to be described later) of the host device.

The target device sets the capability (including the transport protocol) of the host device.

At STEP 2:

Print data is transferred by the protocol determined at the STEP 1.

At STEP 3:

The host device disconnects the connection with the target device.

Figure 21:
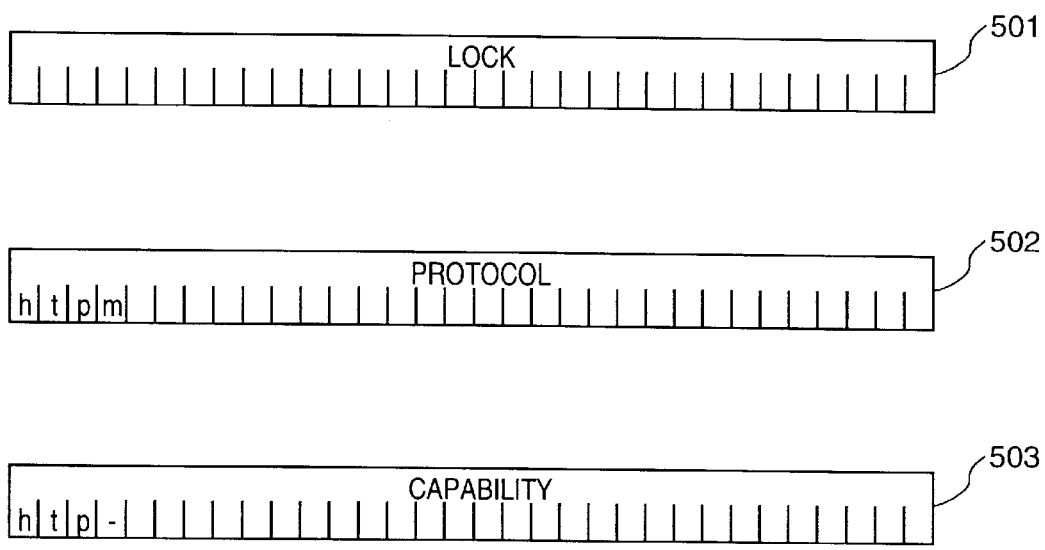
FIG. 21 is a schematic view showing a CSR prepared in respective devices.

FIG. 21 shows control/status register (CSR) which is prepared by a printer as the target device so that the LOGIN protocol is installed, including a lock register 501, a protocol register 502 and the capability register 503. These registers are provided in predetermined addresses in initial unit space in the address space of the 1394 serial bus. That is, as shown in FIG. 3, within the 48-bit address area provided to the devices, "0xFFFFF" in the first 20-bits is called "register space", wherein a register (CSR core) as the core of the CSR architecture is arranged in the first 512 bytes. Note that information common to devices connected via the bus is provided in this register space. Further, "0–0xFFFFD" is called "memory space", and "0xFFFFE", "private space". The private space is an address which can be freely used in the device for communication among the devices.

The lock register 501 indicates a locked status of a resource, with a value "0" indicative of log-in enable status, and any value but "0", an already-logged-in and locked status. The capability register 503 indicates a protocol where each bit represents a protocol, with a value "1" bit indicating that a corresponding protocol can be set, while a value "0" bit, that a corresponding protocol cannot be set. The protocol register 502 indicates a currently set protocol. That is, each bit of the protocol register 502 corresponds to each bit of the capability register 503, and the value of a bit of the protocol register 502 corresponding to the set protocol is "1".

Further, the protocol register 502 has an h bit indicative of a host device, a t bit indicative of a target device, a p bit indicative of a protocol master and an m bit indicative of a protocol for multi-login, as well as the bits indicative of the protocols.

The capability register 503 has an h bit indicative of possibility of becoming a host device, a t bit indicative of possibility of becoming a target device, a p bit indicative of possibility of becoming a protocol master and a reservation bit corresponding to the m bit of the protocol register 502, as well as the bits indicative of the settable protocols.

The protocol master is a device which obtains settable protocols in devices supporting the LOGIN protocol connected to the 1394 serial bus, performs majority decision on the obtained protocols, and notifies the respective devices of a protocol to be used prior to the other protocols. If there are a plurality of devices which can be a protocol master, adjustment is performed among the nodes, to determine a protocol master.

Figure 22:
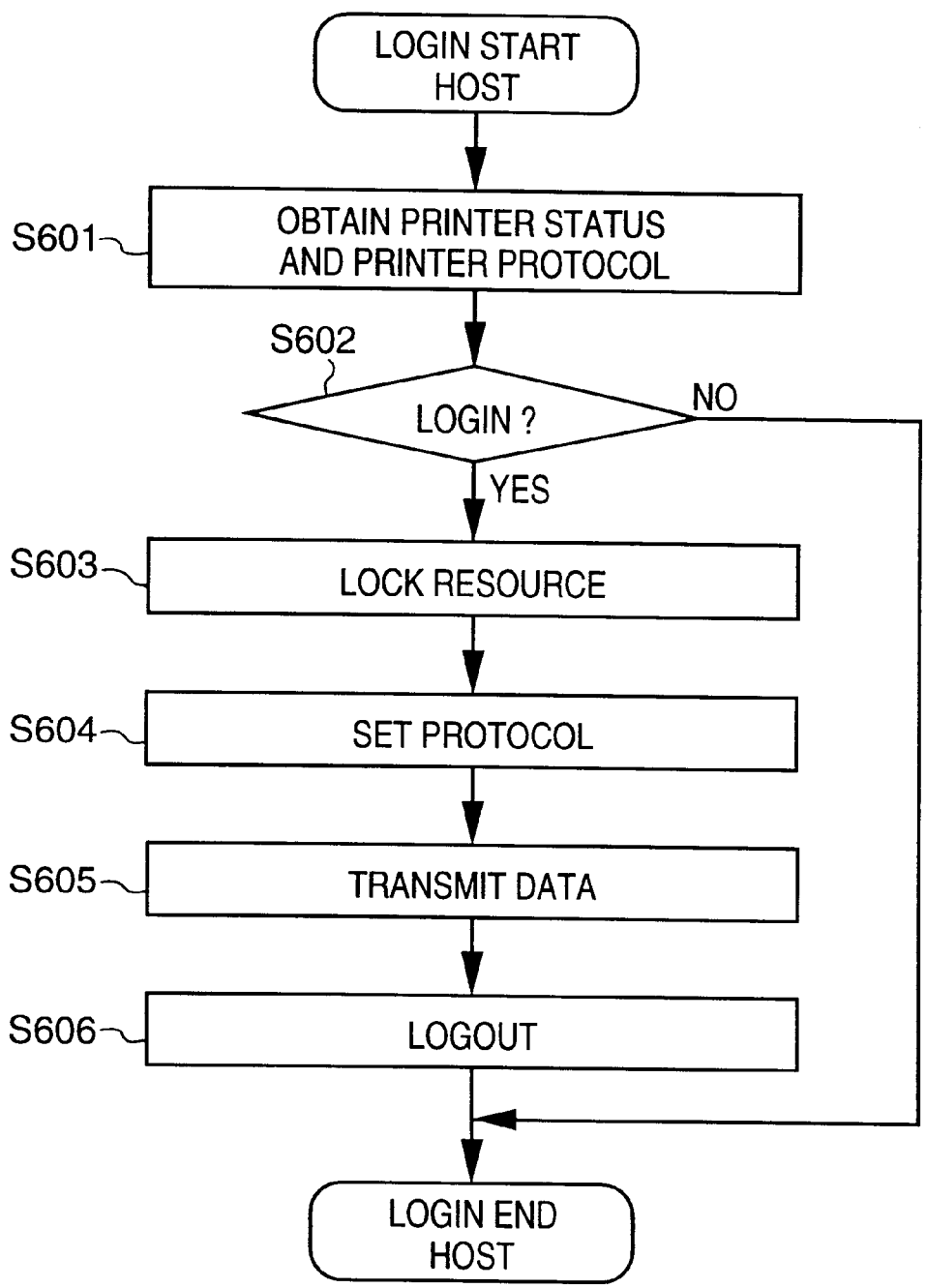
FIG. 22 is a flowchart showing LOGIN processing in a host device.

FIG. 22 is a flowchart showing LOGIN processing in the host device.

To start the LOGIN processing, first, the data of the lock register 501, the protocol register 502 and the capability register 503 of a target device e.g., a printer, to be logged-in, are checked by read transaction. At this time, from the data of the capability register 503, it is examined whether or not the target device supports a protocol used by the host device for communication (step S601). If the target device does not support the protocol of the host device, the LOGIN processing is terminated at step S602.

Further, if the data value of the lock register 501 is not "0", it is determined that another device is in logged-in status, and the LOGIN processing is terminated. If the data value of the lock register 501 is "0", it is determined that log-in is currently possible (step S602).

In case of log-in enable status, the process moves to resource lock processing where the log-in is set by writing "1" into the lock register 501 of the printer by using lock transaction (step S603). The target device is locked in this status, and it is uncontrollable from other devices and the register values cannot be changed.

As described above, in the status where the resource of the target device is locked, protocol setting is performed next. The printer as the target device of the present embodiment supports a plurality of printer protocols, the printer must be informed of the protocol which can be used by the host device before it receives print data. In the present embodiment, the protocol to be used is notified to the printer by setting the corresponding bit of the protocol register 502 of the printer by write transaction (step S604).

At this point, as the protocol used by the host device for communication has been notified to the target device and the target device is in locked status, the host device that is currently logged in the target device performs data (print data in this case) transfer (step S605).

When the data transfer has been completed, the host device logs out from the printer by clearing the lock register 501 and the capability register 503 of the target device (step S606).

Figure 23:
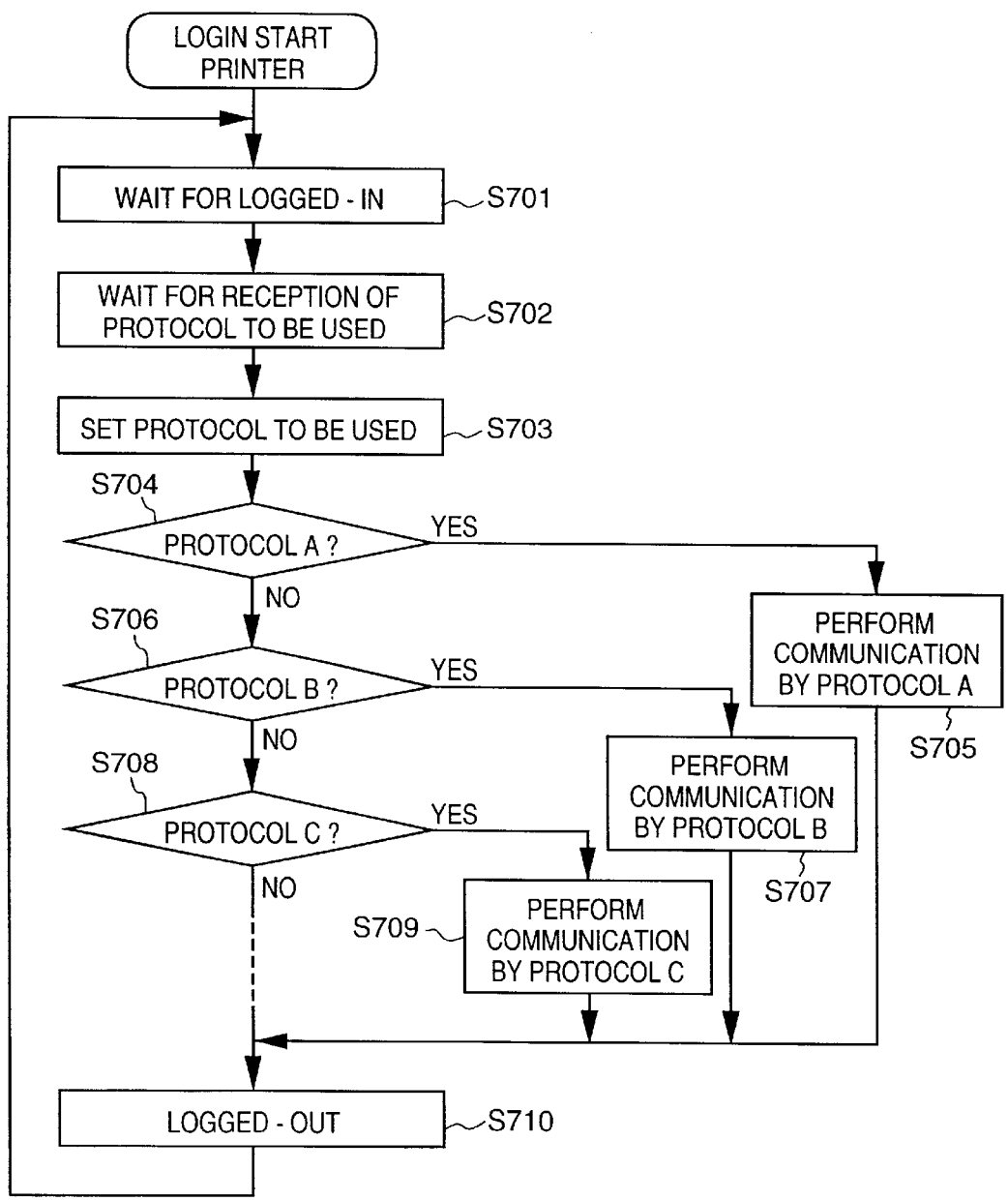
FIG. 23 is a flowchart showing LOGIN processing in a target device.

FIG. 23 is a flowchart showing the LOGIN processing in the printer as the target device.

The printer generally waits for log-in from a host device. As a print request from a host device is started by reading data values from the lock register 501, the protocol register 502 and the capability register 503 of the printer, the registers must be in read-enable status. This processing will be described on the assumption that a host device which is to perform printout has locked the printer (step S701).

The printer waits for notification of an available protocol from the host device (step S702). The printer receives the notification of available protocol in locked status so as to maintain the protocol register 502 unchanged by another device's request in mid-course of the log-in processing.

When the available protocol has been assigned (step S703), the printer switches its own protocol to the assigned protocol (steps S704, S706 and S708), and performs communication in accordance with the protocol of the host device (steps S705, S707 and S709).

When the communication has been completed, the printer confirms that the lock register 501 and the capability register 503 have been cleared (step S710), and returns to the log-in waiting status (step S701).

Second Embodiment

Figure 24:
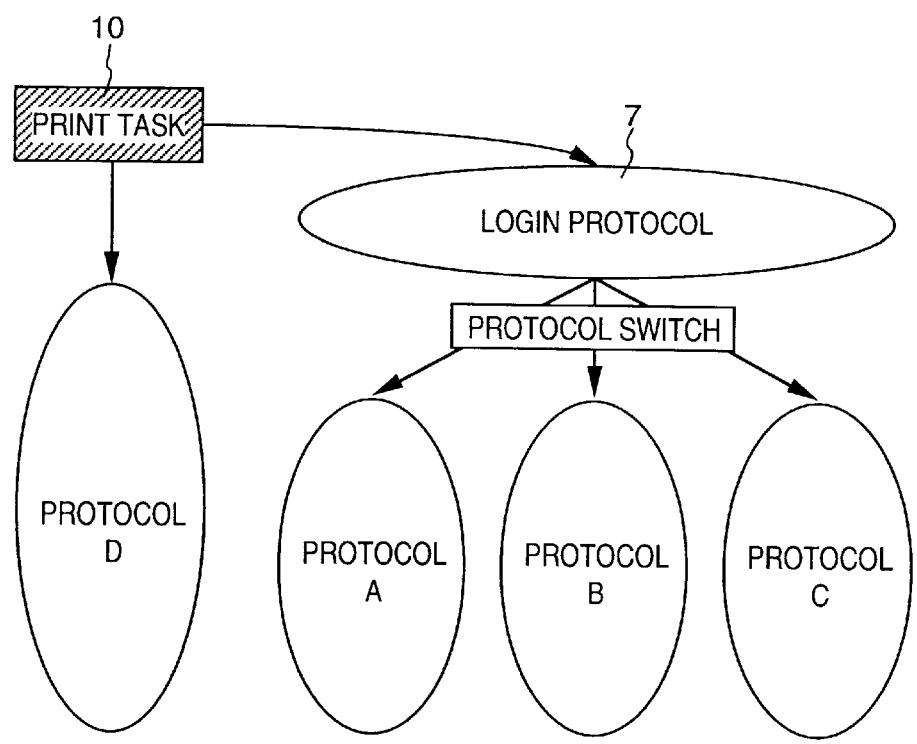
FIG. 24 is an explanatory view showing the operation according to a second embodiment.

FIG. 24 shows the operation according to a second embodiment of the present invention. Compared with the first embodiment as shown in FIG. 18, the second embodiment is applicable to a device having a protocol D in which is not installed in the LOGIN protocol 7. That is, to assure the device only corresponding to the protocol D (e.g., AV/C protocol) of print operation, as well as devices having the LOGIN protocol 7, the printer side has the protocol D.

In this case, if the printer recognizes, by a print request performed at the beginning of connection, that the host device does not assign a protocol in the LOGIN protocol 7, the printer tries communication with the host device by using the protocol D, and if the communication can be established, the printer executes the print task 10 in accordance with the protocol D.

Figure 25:
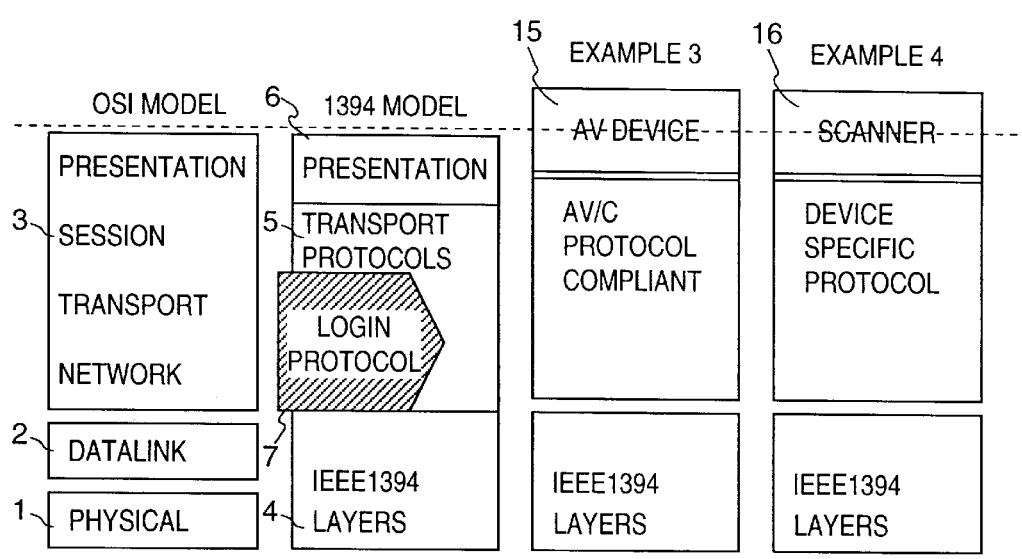
FIG. 25 is a schematic view showing the IEEE 1394 serial interface in comparison with an OSI model, in the second embodiment.

FIG. 25 shows the IEEE 1394 serial interface according to the second embodiment in comparison with the OSI model. Example 3 uses, as a model, an AV device 15 based which uses the AV/C protocol. In the AV device 15, the LOGIN protocol 7 is not installed. Example 4 uses, as a model, a scanner 16, in which the LOGIN protocol 7 is not installed, but a non-standard protocol (device specific protocol) for scanner is installed.

That is, regarding a device in which the LOGIN protocol 7 is not installed, if the printer can perform communication using the protocol of the device, the printer can perform print task from the device. This increases the types of devices that can use the printer.

Third Embodiment

Figure 26:
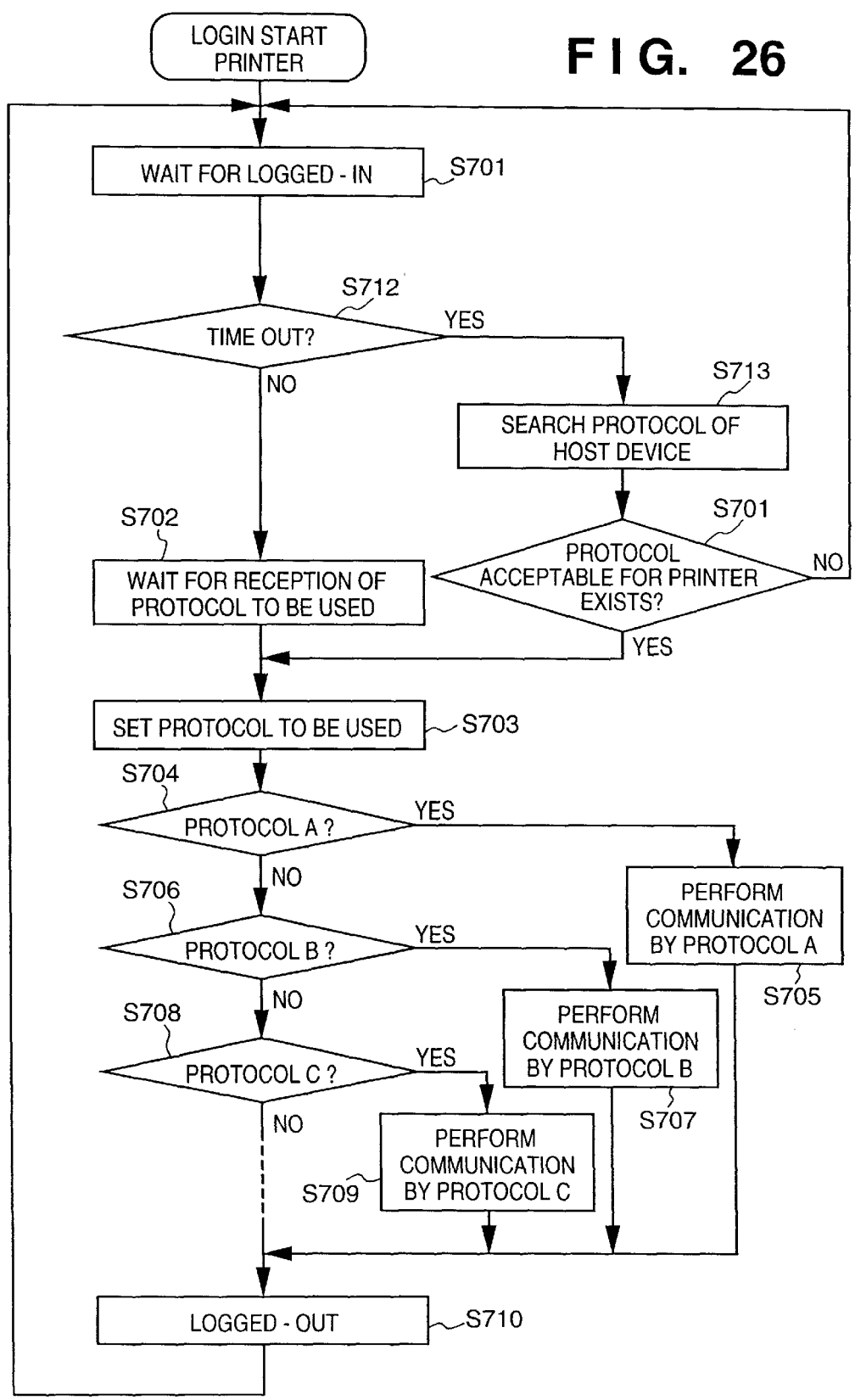
FIG. 26 is a flowchart showing the LOGIN processing in a printer according to a third embodiment.

FIG. 26 is a flowchart showing the LOGIN processing in the printer according to a third embodiment of the present invention. Note that steps identical to those in FIG. 23 have the same step numbers, and detailed explanation of these steps will be omitted.

Generally, the printer is waiting for log-in by a host device (step S701). The log-in waiting status (step S701) becomes time-out status after a predetermined period, and at step S712, it is determined whether or not the printer is in time-out status. If the printer is logged in within the predetermined period and it is determined at step S712 that the printer is not in the time-out status, the processing as described in FIG. 23 is performed.

On the other hand, if the time-out status is determined at step S712, the protocol of the host device is searched (step S713). Although the details of the protocol search will be described later, the protocol search is for finding a node to be the host device and searching for the protocol, used by the host device, by using the node ID.

From the result of protocol search at step S713, it is determined at step S714 whether or not any one of protocols used by the printer corresponds to the protocol used by the host device. If it is determined at step S714 that the printer corresponds to the protocol used by the host device, the protocol is set (step S703). On the other hand, if the printer does not correspond to the protocol used by the host device, the printer enters the log-in waiting status (step S701).

That is, in the LOGIN processing in the printer in the third embodiment, when the printer is logged in and a protocol to be used is notified (step S702), or a protocol used by the corresponding printer is searched in accordance with the host device by protocol search (step S714), the protocol is set (step S705, S707, S709).

The processing after the protocol setting is the same as that in FIG. 23. However, in a case where the protocol has been determined by the protocol search (step S713), the printer has not been logged in, accordingly, log-out processing (step S710) is not performed. In this case, the printer enters the log-in waiting step (step S701) by reset of the bus, the host device or the printer.

Figure 27:
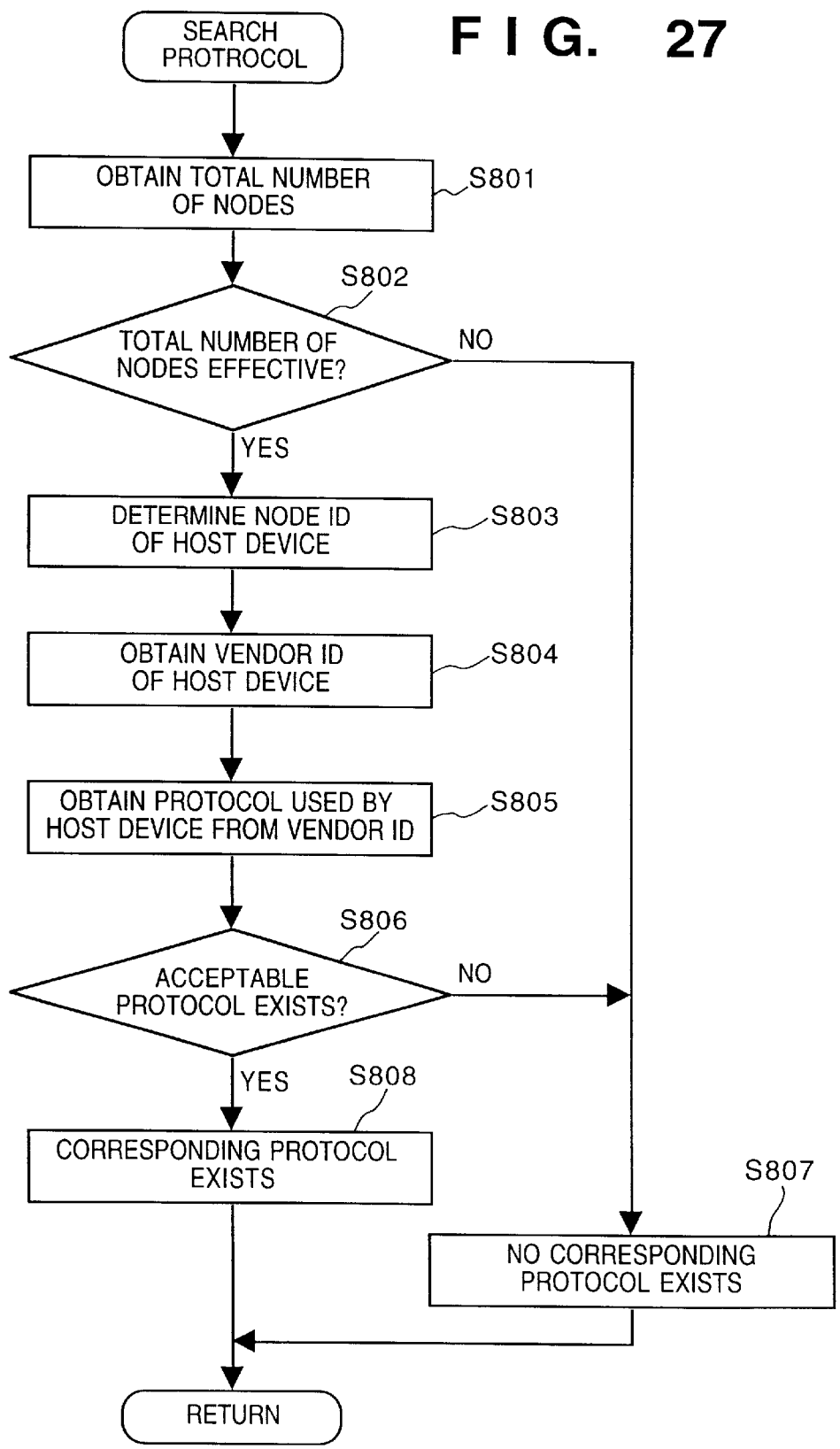
FIG. 27 is a flowchart showing protocol search processing.

FIG. 27 is a flowchart showing the above protocol search processing.

First, the total number of nodes on the bus is obtained (step S801). The total number of nodes on the bus is obtained from a topology map or the like, held by a bus manager.

Next, it is determined whether or not the total number of nodes obtained at step S801 is effective (step S802). The determination is made such that if the total number of nodes is one or three or more, i.e., there is no other node than the current node, the total number of nodes is ineffective. In other words, only when the total number of nodes is two, the determination result is effective. If it is determined at step S802 that the total number of nodes is ineffective, it is determined that there is no acceptable protocol (step S807), then the process returns to the processing in FIG. 26.

On the other hand, if the total number of nodes is effective, a node ID of the communication destination device (host device) is determined (step S803). As the total number of the nodes is two, if the node ID of the printer is "0", the ID of the destination device is "1". If the node ID of the printer is "1", the destination device is "0". In this manner, the node ID of the destination device is simply determined.

Next, a vendor ID of the host device is obtained (step S804). The vendor ID is obtained by reading the "node_ vendor_id", "chip_id_hi" and "chip_id_lo" in the configuration ROM by transaction. As described above, since the vendor ID has a numerical value unique to the device, the host device is specified from the vendor ID. Then, the protocol used by the host device is obtained from the specified device information (step S805).

Next, it is determined whether or not any one of protocols used by the printer corresponds to the protocol used by the host device (step S806). If the printer does not correspond to the protocol, it is determined that there is no corresponding protocol (step S807), while if the printer corresponds to the protocol, it is determined that there is a corresponding protocol (step S808) and the process returns to the processing in FIG. 26. Accordingly, as the result of protocol search, the existence/absence of corresponding protocol is determined.

In this manner, by the processing shown in FIGS. 26 and 27, with regard to even a host device which does not perform log-in operation, the printer specifies the protocol used by the host device from the vendor ID of the host device, and if the printer corresponds to the specified protocol, the printer performs communication with the host device by using the protocol.

Fourth Embodiment

Figure 28:
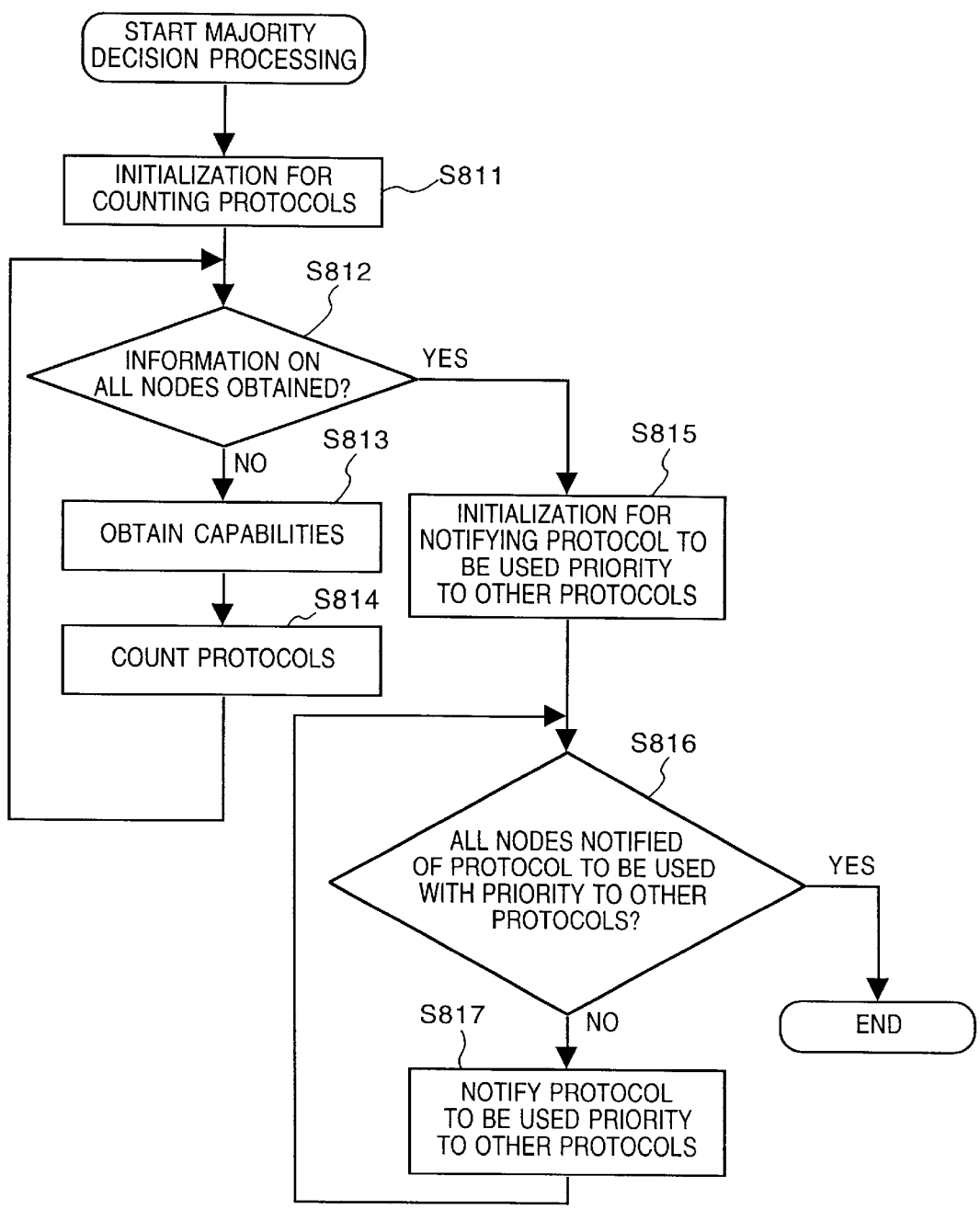
FIG. 28 is a flowchart showing protocol majority decision processing performed by a protocol master, according to a fourth embodiment.

FIG. 28 is a flowchart showing the protocol majority decision processing performed by a protocol master, i.e., processing to determine a protocol, which is supported by the greatest number of devices, to be used prior to the other protocols, according to a fourth embodiment of the present invention.

First, initialization processing is performed to count the number of protocols (step S811). Next, it is determined whether or not the information on all the nodes have been obtained (step S812). If the information on all the nodes have not been obtained, the content of the capability register 502 of the node of interest is read out, and settable protocols are counted (step S813). Among protocols available in the respective nodes, the number of protocols commonly used by a plurality of nodes are counted. As a protocol of the greatest number is a protocol used by the greatest number of nodes, this node should be used priori to other nodes, then the process returns to step S812.

If it is determined at step S812 that the information on all the nodes have been obtained, initialization processing is performed (step S815) so as to notify a protocol to be used prior to the other protocols. Next, it is determined whether or not all the nodes have been notified of the protocol to be used prior to the other protocols (step S816), and if YES, the process ends, while if NO, the protocol to be used prior to the other protocols is notified (step S817), then the process returns to step S816.

Figure 29:
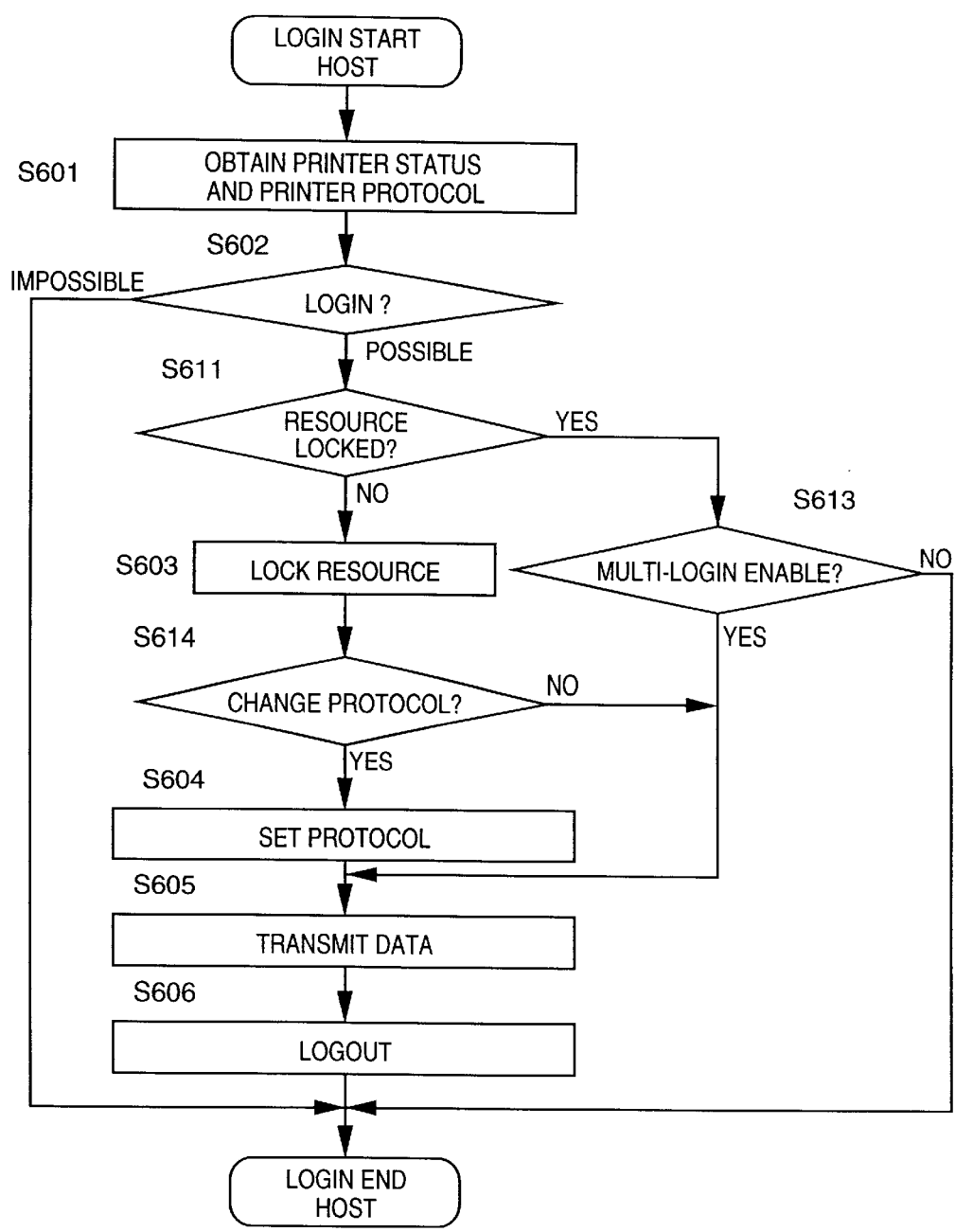
FIG. 29 is a flowchart showing the LOGIN processing in the host device.

FIG. 29 is a flowchart showing the LOGIN processing in the host device. Note that the steps identical to those in FIG. 22 have the same step numbers, and detailed explanations of these steps will be omitted.

If the printer supports the protocol used by the host device for communication, it is determined whether or not the printer has already been logged in and the resource has been locked (step S611), by determining whether or not the value of the lock register 501 obtained at step S601 is "0". If it is determined at step S611 that another device has logged in the printer (lock register 501≠0), it is determined, from the content of the protocol register 502 obtained at step S601, whether or not the protocol currently set in the printer is appropriate for multi-login (step S613). If it is determined at step S613 that the protocol is appropriate for multi-login, the process proceeds to step S605, while if the protocol is not appropriate for multi-login, the process ends.

On the other hand, if it is determined at step S611 that another device has not logged in the printer and the printer is in log-in enable status (lock register 501=0), the resource of the printer is locked (step S603).

Next, as described with reference to FIG. 22, the protocol setting is performed. In the present embodiment, if both host device and printer support the protocol to be used prior to the other protocols, notified by the protocol master, this protocol is used prior to the other protocols. Further, if there is a protocol appropriate for multi-login among protocols supported by both host device and printer, the protocol appropriate for multi-login is used prior to the other protocols. Thus, as the protocol to be used has been determined, it is determined whether or not the protocol is that currently set in the printer (step S614). If the protocol is different from that currently set in the printer, protocol setting is performed at step S604 to change the protocol. Note that if the LOGIN processing is required in the protocol used for communication, the host device uses the protocol, and performs the LOGIN processing at the beginning of data transmission at step S605. Further, in case of the protocol used for communication is appropriate for multi-login, the LOGIN processing is performed at the beginning of step S605.

When the data transmission has been completed, as described with reference to FIG. 22, the host device clears the lock register 501 of the printer so as to release the resource lock status of the printer. In a case where communication is performed by using the protocol appropriate for multi-login, the host device releases the resource lock status of the printer if another device does not log in the printer.

Figure 30:
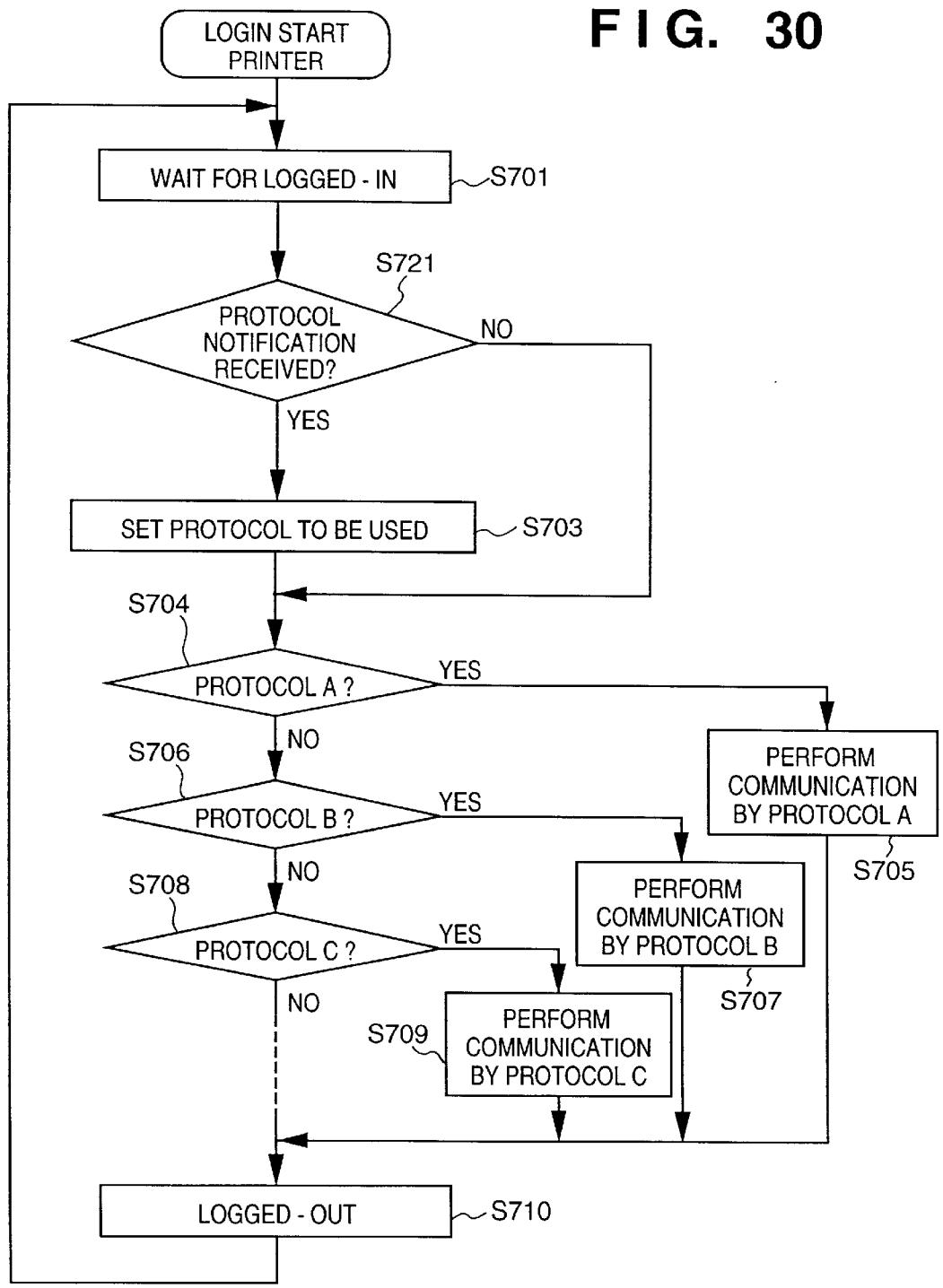
FIG. 30 is a flowchart showing the LOGIN processing in the printer.

FIG. 30 is a flowchart showing the LOGIN processing in the printer (target device). Note that the steps identical to those in FIG. 23 have the same step numbers, and detailed explanations of these steps will be omitted.

The printer is logged in by the host device at step S701. Then it is determined whether or not protocol notification has been received from the host device (step S721), if YES, the protocol designated from the host device is set (step S703).

On the other hand, if it is determined at step S721 that the protocol notification has not been received, the processing at step S703 is not performed, the process proceeds directly to step S704.

Thereafter, as described with reference to FIG. 23, communication is performed by the processing at steps S704 to S709. In a protocol appropriate for multi-login, log-in by a plurality of host devices are accepted. Then, when communication with all the host devices has been completed, the printer confirms that the lock register 501 has been cleared by the host devices (step S710), and returns to the status waiting for log-in from a host device (step S701).

Fifth Embodiment

FIG. 31 shows the format of a printer map (or printer table) in a network constructed with the 1394 serial bus. The printer map contains a unique ID, a node ID, the status and capability of each printer node which has returned a response. The status indicates, e.g., the content of the protocol register 502 in FIG. 21, and the capability, e.g., the content of the capability register 503 in FIG. 21.

FIG. 32 shows the format of the unique ID of a node in the CSR architecture. FIG. 33 shows the format of a printer-map (FIG. 31) generation command. The command is notified to a target device by write transaction of asynchronous packet. The command as shown in FIG. 33 is assigned in this protocol at a predetermined address in the unit space of the target in the 1394 address space.

Figure 34:
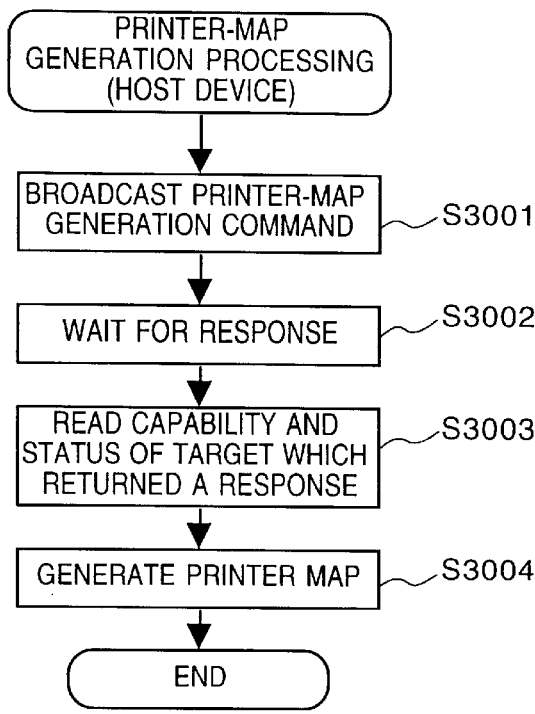
FIG. 34 is a flowchart showing printer-map generation processing performed by the host device when a plurality of multi-protocol printers are connected to the network.

FIG. 34 is a flowchart showing the printer-map generation processing performed by the host device when a plurality of multi-protocol printers are connected to the network.

Generally, various devices are connected to the network. In this situation, when an initiator (host device) tries printing, it is necessary to find nodes connected to the printer. Further, to obtain appropriate print output, it is very convenient to know the physical position, capability and excessive processing capability of the printer. Then, in this embodiment, the host device examines printers connected to the same network. For example, upon print output, the initiator (host device) obtains information on the physical positions, the capabilities and excessive processing capabilities of the printers on the network, (hereinafter also referred to as "topology/capability information") and generates a printer map in advance, then selects a target printer based on the printer map.

Hereinbelow, the printer-map generation processing by the host device will be described with reference to FIG. 34. First, the host device broadcasts the printer-map generation command (FIG. 33) to generate the printer map (step S3001), and becomes into waiting status to wait for reception of response commands from the printers as target devices (step S3002).

When the host device receives response commands from the target devices, it reads the contents of the protocol register 502 and the capability register 503 of the target devices which returned the response commands (step S3003). Then, the host device generates a printer map for the printers currently constructing the network (step S3004), based on the information obtained at step S3003.

Figure 35:
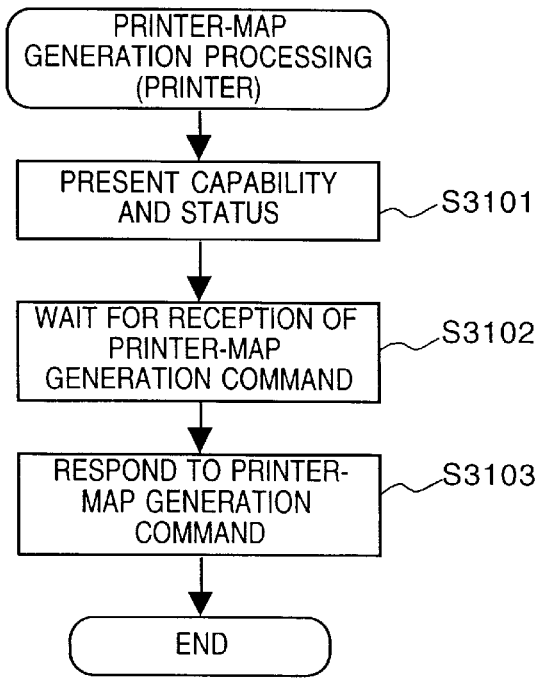
FIG. 35 is a flowchart showing processing in a target device corresponding to the printer-map generation processing by the host device.

FIG. 35 is a flowchart showing processing in the target device corresponding to the printer-map generation processing by the host device, i.e., the printer. First, the power of the printer is turned on, then the printer presents its status and capability (step S3101). More specifically, the printer sets the protocol register 502 and the capability register 503 in accordance with the current capability and status. Accordingly, change of the status and capability within the printer are reflected on the status and capability registers presented at this step.

Next, the printer becomes into waiting status to wait for reception of the printer-map generation command from the host device (step S3102). Then, when the printer receives the printer-map generation command from the host device, returns the response command to the host device (step S3103).

Figure 36:
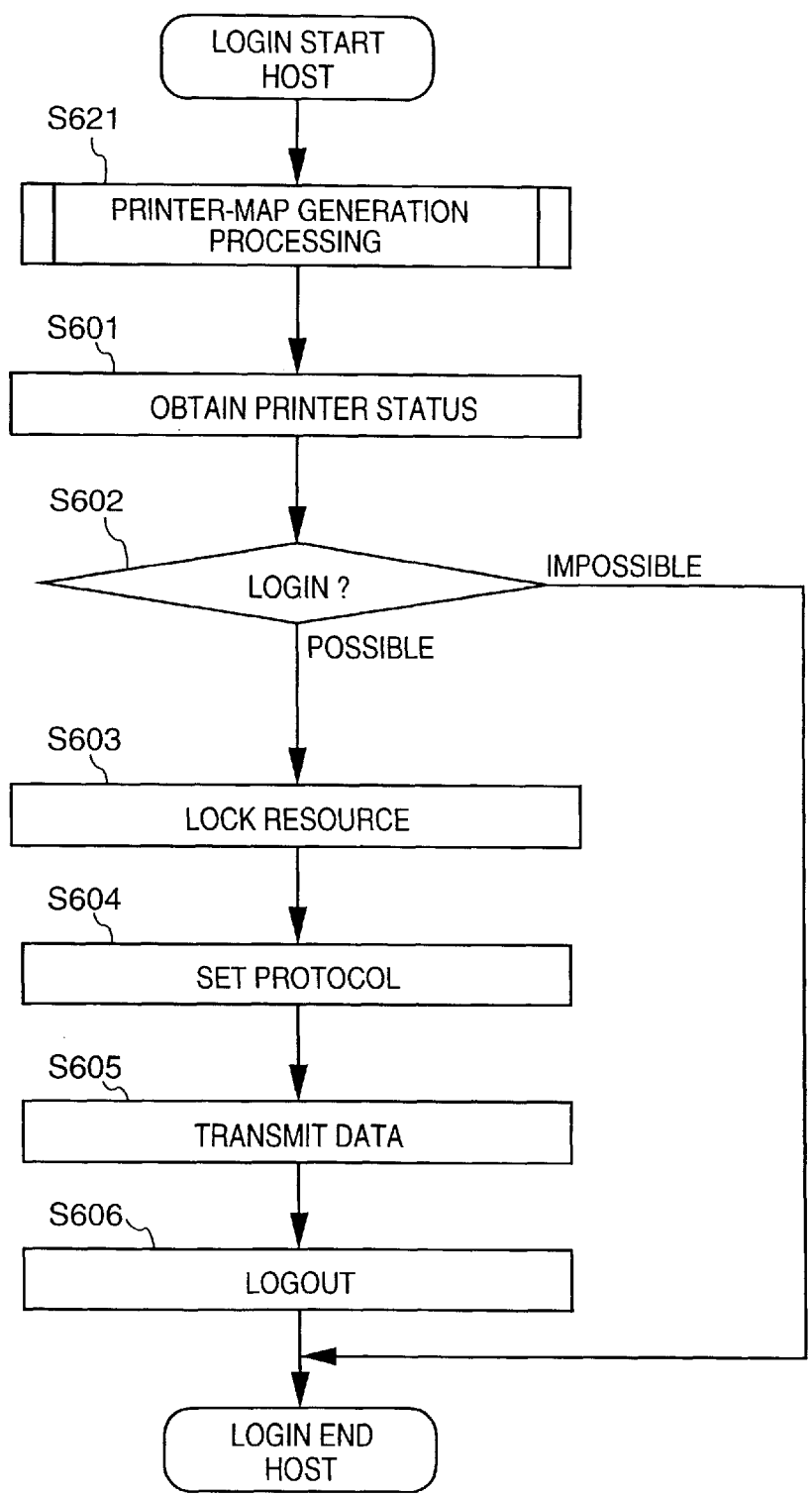
FIG. 36 is a flowchart showing the LOGIN processing in the host device.

FIG. 36 is a flowchart showing the LOGIN processing in the host device. Note that the steps identical to those in FIG. 22 have the same step numbers, and detailed explanations of these steps will be omitted. That is, to start the LOGIN processing, the printer-map generation processing (step S621) shown in FIG. 34 is performed, then processing the same as that in FIG. 22 is performed.

Figure 37:
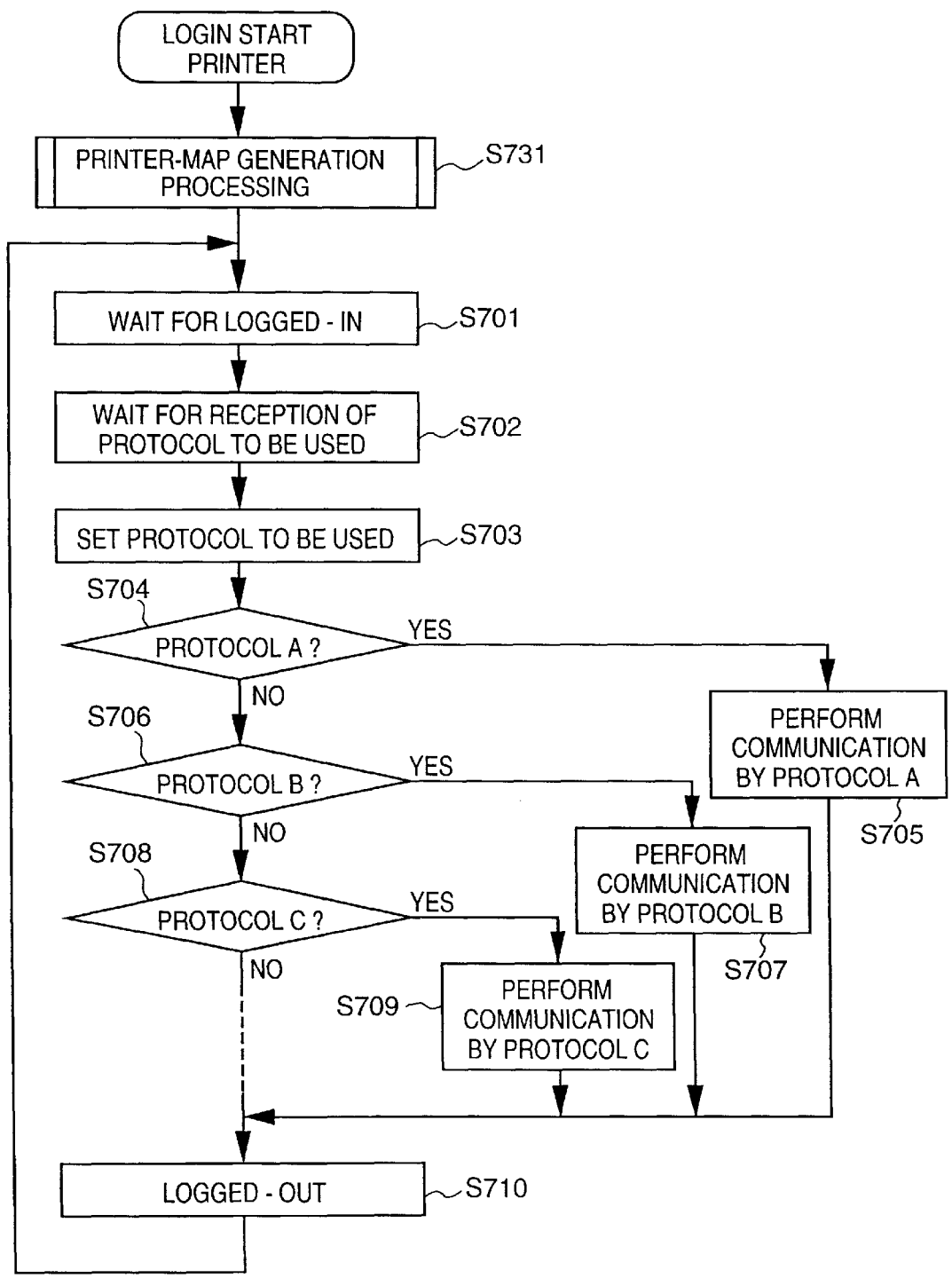
FIG. 37 is a flowchart showing the LOGIN processing in the printer.

FIG. 37 is a flowchart showing the LOGIN processing in the printer. Note that the steps identical to those in FIG. 23 have the same step numbers, and detailed explanations of these steps will be omitted. That is, the printer first performs the printer-map generation processing (step S731) shown in FIG. 35, then becomes into waiting status to wait for log-in from the host device, and performs processing the same as that in FIG. 23.

Sixth Embodiment

Next, a sixth embodiment of the present invention will be described. In the fifth embodiment, as described with reference to FIGS. 34 and 35, when a plurality of printers are connected to a network, a host device generates a printer map on the printers connected to the network, and selects a target printer based on the printer map. In the sixth embodiment, in a case where a host device and a printer support a plurality of protocols on a network, further, a plurality of printers each supporting a plurality of protocols are connected to the network, the host device examines protocols available for the respective printers, and determines a protocol supported by the greatest number of printers, as a protocol to be used.

Note that the processing in the sixth embodiment is the same as that in the fifth embodiment except the processing shown in FIGS. 34 and 35, therefore, detailed explanation of the processing in the sixth embodiment will be omitted, and Hereinbelow, only the difference from the fifth embodiment will be described.

Figure 38:
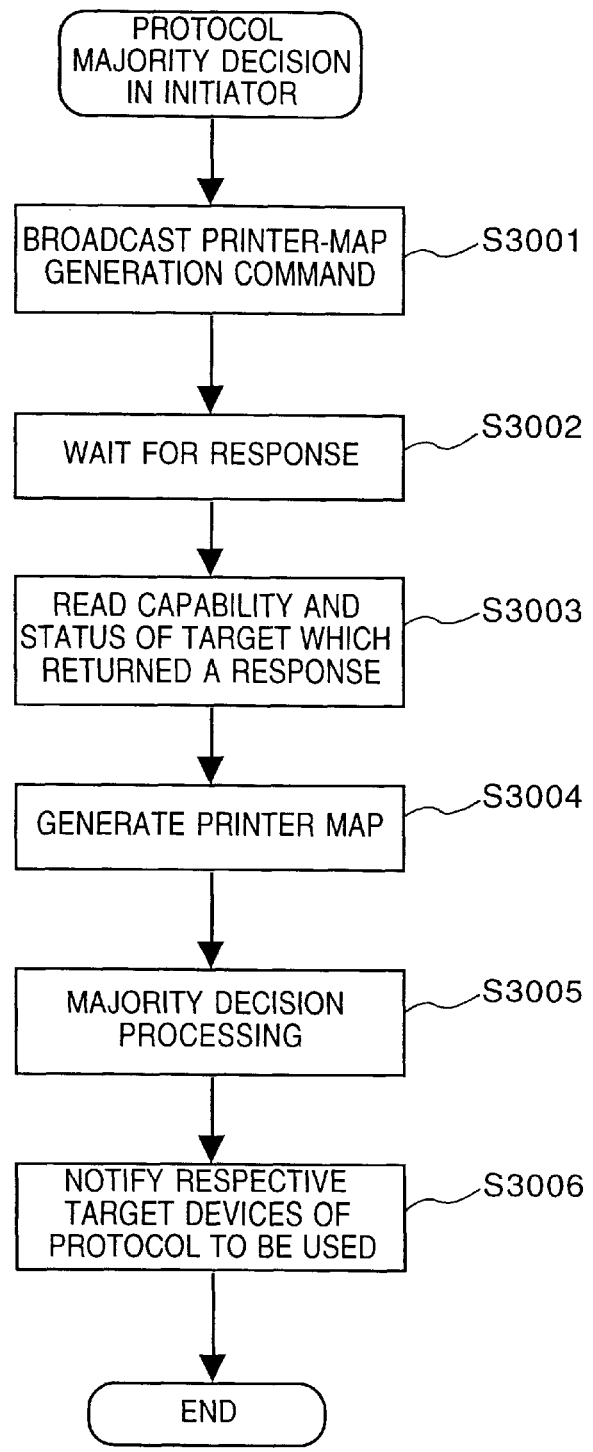
FIG. 38 is a flowchart showing the majority decision processing in the host device.
Figure 39:
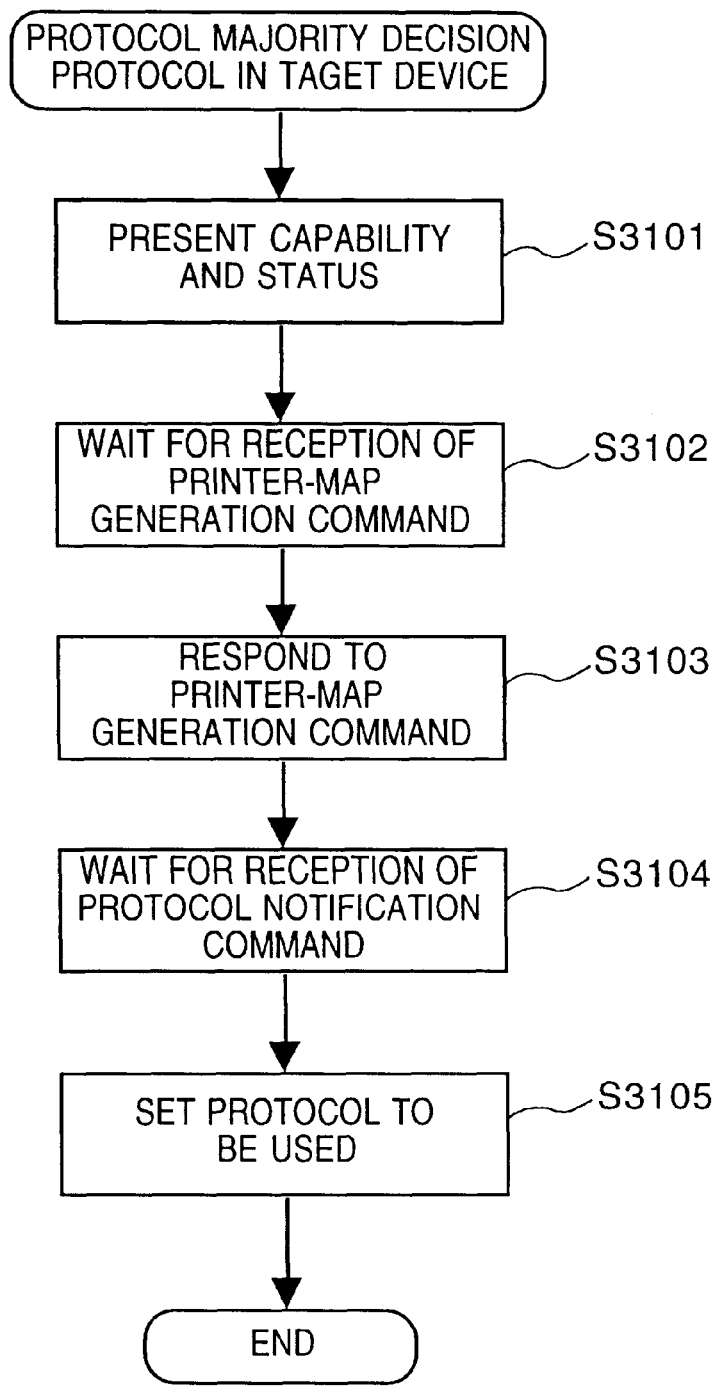
FIG. 39 is a flowchart showing processing in the printer corresponding to the processing in FIG. 38.

FIG. 38 is a flowchart showing the majority decision processing by the host device according to the sixth embodiment. FIG. 39 is a flowchart showing processing corresponding to that in FIG. 38. Note that the steps identical to those in FIGS. 34 and 35 have the same step numbers and detailed explanations of these steps will be omitted.

The processing in FIG. 38 is performed at step S621 in the LOGIN processing in the host device shown in FIG. 36. The processing in FIG. 39 is performed at step S731 in the LOGIN processing in the printer shown in FIG. 37. As described above, both initiator (host device) and target device (printer) support a plurality of protocols, further, a plurality of printers each supporting a plurality of protocols are connected to the same network. In this case, the initiator and the target devices must use the same protocol. To determine the protocol to be used, the initiator examines protocols available for the respective printers, and determines the protocol supported by the greatest number of printers as the protocol to be used. This processing is referred to as majority decision processing. In this manner, by performing the majority decision processing in the situation where a number of protocols are available, the protocols to be actually used is reduced. As a result, load due to protocol switching by the initiator can be reduced.

Next, the printer-map generation processing by the initiator (host device) and the target device (printer), and the majority decision processing by the initiator will be described with reference to FIGS. 38 and 39.

When the printer-map generation has been completed (step S3004), the host device examines protocols available for the multi-protocol printers currently connected to the network, based on the generated printer map, and selects a protocol supported by the greatest number of printers (step S3005). Then the host device notifies the respective printers of the selected protocol by a protocol notification command (step S3006).

On the other hand, the printer returns a response to the printer-map generation command to the host device (step S3103), and enters in a waiting status to wait for reception of the notification command indicating the protocol to be used, from the host device (step S3104). When the printer receives the protocol notification command from the host device, it returns a response to the notification command to the host device, and sets the notified protocol to be used (step S3105).

Modifications of Embodiments

The above embodiments have been described in a case where a network is constructed by using the serial bus based on the IEEE 1394 standards, however, the present invention is not limited to the 1394 serial bus. For example, the present invention is applicable to a network constructed by using an arbitrary serial interface such as a Universal Serial Bus (USB).

Further, the identifier (ID) unique to each device may be an ASCII code, binary data, or a company name or personal name as a device owner. Further, the identifier may be a network address such as an Internet Protocol (IP) address or a Media Access Control (MAC) address. Further, the identifier may be a variable identifier instead of unique identifier to each device, or may be an encryption key. That is, any information is included in the identifier of the present invention as long as it can be used for identifying each device.

Note that in the above embodiments, the printer has been mainly described as a target device or a host device on the network. However, the target device is not limited to the printer but may be any other device such as a monitor, a computer, a digital camera, a scanner, a digital video and an external storage device. Further, the target device is not limited to any special device model.

Further, in the printer map generation performed at step S621 in FIG. 36, step S731 in FIG. 37 and step S3001 in FIG. 38, the network topology indicating the connection status of respective nodes is examined as shown in FIG. 9, and a display map is generated. By judging such network topology, a printer and a protocol to be actually used are determined, not simply by majority decision, but in consideration of the network topology, i.e., the connection status of each node.

As described above, according to the third embodiment, the printer searches for the protocol of the host device, and if the printer corresponds to the protocol, communication is performed by using the protocol. This adjusts a communication protocol with respect to even a host device which does not correspond to an initial protocol such as the LOGIN protocol.

Further, according to the fourth embodiment, in a case where one of plural protocols is selected, degradation of efficiency can be prevented by reducing protocol change frequency. Further, occupation of a device can be prevented by using a protocol, which allows log-in by a plurality of devices, prior to the other protocols.

Further, according to the fifth embodiment, the host device examines information on printers connected to the same network, e.g., positions on the network, capabilities, statuses and excessive processing capabilities, whereby selects a printer appropriate for a print purpose, thus obtains appropriate print output.

Further, according to the sixth embodiment, in a case where a number of protocols are available, the types of protocols to be actually used can be reduced by determining a protocol supported by the greatest number of printers as a protocol to be used. This reduces load due to protocol change by the host device.

Other Embodiment

The present invention can be applied to a system constituted by a plurality of devices (e.g., host computer, interface, reader, printer) or to an apparatus comprising a single device (e.g., copy machine, facsimile).

Further, the object of the present invention can be also achieved by providing a storage medium storing program codes for performing the aforesaid processes to a system or an apparatus, reading the program codes with a computer (e.g., CPU, MPU) of the system or apparatus from the storage medium, then executing the program.

In this case, the program codes read from the storage medium realize the functions according to the embodiments, and the storage medium storing the program codes constitutes the invention.

Further, the storage medium, such as a floppy disk, a hard disk, an optical disk, a magneto-optical disk, CD-ROM, CD-R, a magnetic tape, a non-volatile type memory card, and ROM can be used for providing the program codes.

Furthermore, besides aforesaid functions according to the above embodiments are realized by executing the program codes which are read by a computer, the present invention includes a case where an OS (operating system) or the like working on the computer performs a part or entire processes in accordance with designations of the program codes and realizes functions according to the above embodiments.

Furthermore, the present invention also includes a case where, after the program codes read from the storage medium are written in a function expansion card which is inserted into the computer or in a memory provided in a function expansion unit which is connected to the computer, CPU or the like contained in the function expansion card or unit performs a part or entire process in accordance with designations of the program codes and realizes functions of the above embodiments.

The present invention is not limited to the above embodiments and various changes and modifications can be made within the spirit and scope of the present invention. Therefore, to appraise the public of the scope of the present invention, the following claims are made.

What is claimed is:

1. A data communication method for performing data communication between a device, and an apparatus which supports a plurality of communication protocols, comprising the steps of:

waiting for reception of a response to a predetermined login protocol so as to set a communication protocol from the plurality of communication protocols for the data communication between the device and apparatus;

obtaining an identifier of the device in a case where there is no response from the device in a predetermined period, by using an initial protocol which is different from each of the plurality of communication protocols;

selecting a protocol from the plurality of communication protocols, based on the obtained identifier; and setting the selected protocol as the communication protocol.

2. The method according to claim 1, wherein the identifier is a vendor ID stored in a Configuration ROM included in the device.

3. The method according to claim 1, wherein the device and apparatus are connected to a serial bus which is a bus adapted to or based on IEEE 1394 standards or Universal Serial Bus standards.

4. The method according to claim 1, further comprising the step of communicating image data with the device and the apparatus, using the communication protocol.

5. The method according to claim 1, further comprising the step of notifying a protocol to be used in communication by using the initial protocol, if the device supports the initial protocol.

6. the method according to claim 1, further comprising the steps of:

performing a logout process when the response from the device has been received and the data communication is finished; and resetting a bus used in the data communication when the data communication using the selected protocol is finished.

7. A data communication apparatus for performing data communication and supporting a plurality of communication protocols, comprising:

a setting section, arranged to wait for reception of a response to a predetermined login protocol so as to set a communication protocol from the plurality of communication protocols for the data communication between the device and apparatus;

an obtaining section, arranged to obtain an identifier of a device in a case where there is no reception of such response from the device in a predetermined period, by using an initial protocol which is different from each of the plurality of communication protocols; and a selector, arranged to select a protocol from the plurality of communication protocols, based on the obtained identifiers, wherein, when there is no reception of such response from the device, the setting section sets the selected protocol as the communication protocol.

8. The apparatus according to claim 7, wherein the identifier is a vendor ID stored in a Configuration ROM included in the device.

9. The apparatus according to claim 7, wherein the data communication apparatus and the device are connected via a bus adapted to or based on IEEE 1394 standards or Universal Serial Bus standards.

10. The apparatus according to claim 7, further comprising a communication section, arranged to communicate image data with the device using the communication protocol.

11. The apparatus according to claim 7, further comprising a notification section, arranged to notify a protocol to be used in communication by using the initial protocol, if the device supports the initial protocol.

12. The apparatus according to claim 7, further comprising a resetting section arranged to perform a logout process when the response from the device has been received and the data communication is finished, or reset a bus used in the data communication when the data communication using the selected protocol is finished.

13. A computer program product embodying computer program codes for a data communication method of executing data communication between a device, and an apparatus which supports a plurality of communication protocols, the method comprising the steps of:

waiting for reception of a response to a predetermined login protocol so as to set a communication protocol from the plurality of communication protocols for the data communication between the device and apparatus;

acquiring an identifier of the device in a case where there is no response from the device in a predetermined period, by using an initial protocol which is different from each of the plurality of communication protocols;

selecting a protocol from the plurality of communication protocols, based on the acquired identifier; and setting the selected protocol as the communication protocol.

* * * * *